Figure 1:
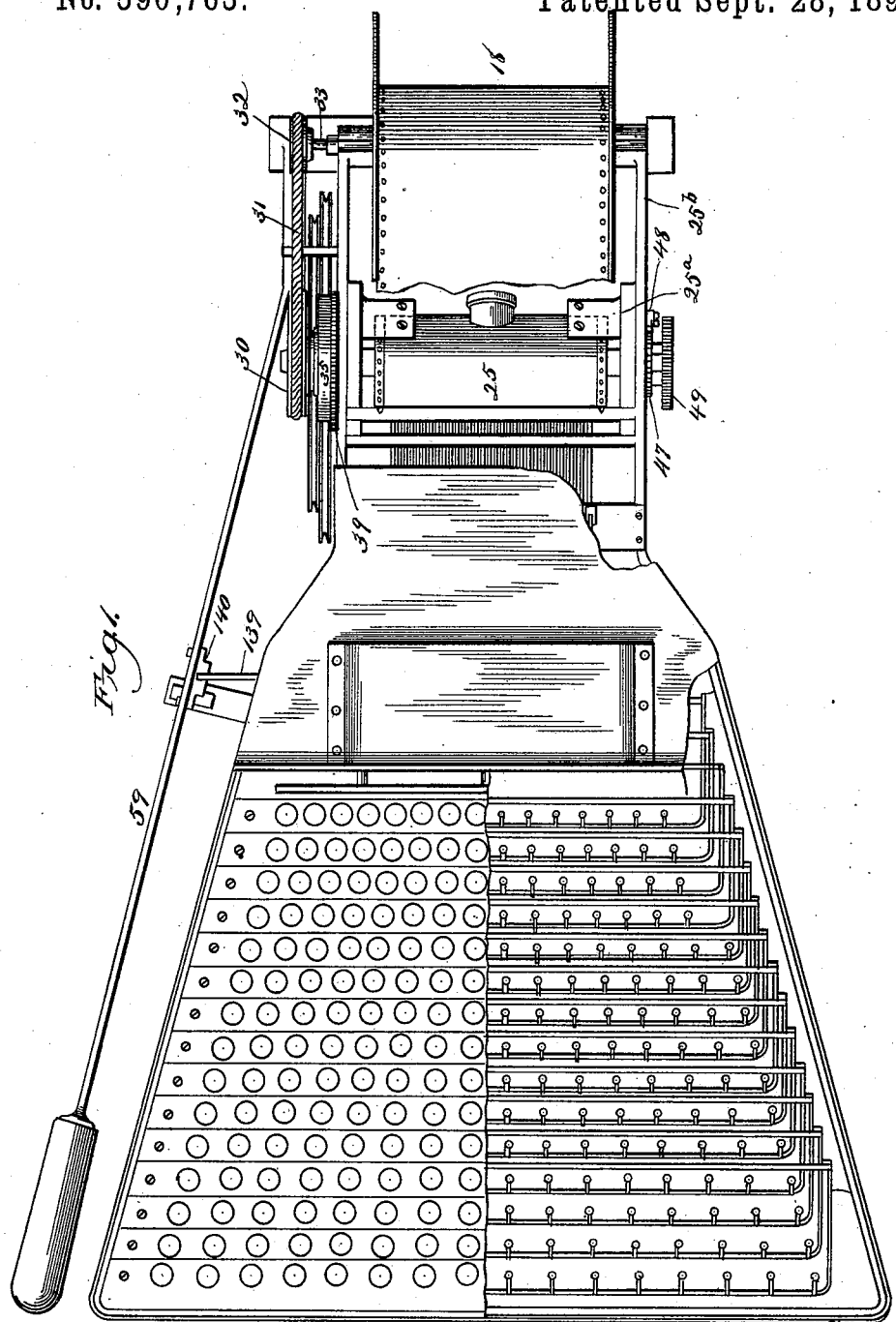

(No Model.) 17 Sheets—Sheet 1.

T. LANSTON.
MACHINE FOR PREPARING PERFORATED RECORD STRIPS OF TYPE FORMING MACHINES.

No. 590,763. Patented Sept. 28, 1897.

Witnesses
A. M. Kelly
Wallace Muddock

Inventor
Tolbert Lanston
By Church & Church
His Attorneys (No Model.) 17 Sheets—Sheet 4.

T. LANSTON.
MACHINE FOR PREPARING PERFORATED RECORD STRIPS OF TYPE FORMING MACHINES.

No. 590,763. Patented Sept. 28, 1897.

Witnesses
A. M. Kelly
Wallace Murdock

Inventor
Tolbert Lanston,
By Church & Church
His Attorneys.

(No Model.) 17 Sheets—Sheet 5.
T. LANSTON.
MACHINE FOR PREPARING PERFORATED RECORD STRIPS OF TYPE FORMING MACHINES.

No. 590,763. Patented Sept. 28, 1897.

Witnesses
A. M. Kelly
Wallace Murdock

Inventor
Tolbert Lanston,
By Church & Church
his Attorneys.

(No Model.) 17 Sheets—Sheet 6.

T. LANSTON.
MACHINE FOR PREPARING PERFORATED RECORD STRIPS OF TYPE FORMING MACHINES.

No. 590,763. Patented Sept. 28, 1897.

Witnesses
A. M. Kelly
Wallace Murdock

Inventor
Tolbert Lanston.
By Church & Church
his Attorneys.

(No Model.) 17 Sheets—Sheet 7.
T. LANSTON.
MACHINE FOR PREPARING PERFORATED RECORD STRIPS OF TYPE FORMING MACHINES.
No. 590,763. Patented Sept. 28, 1897.
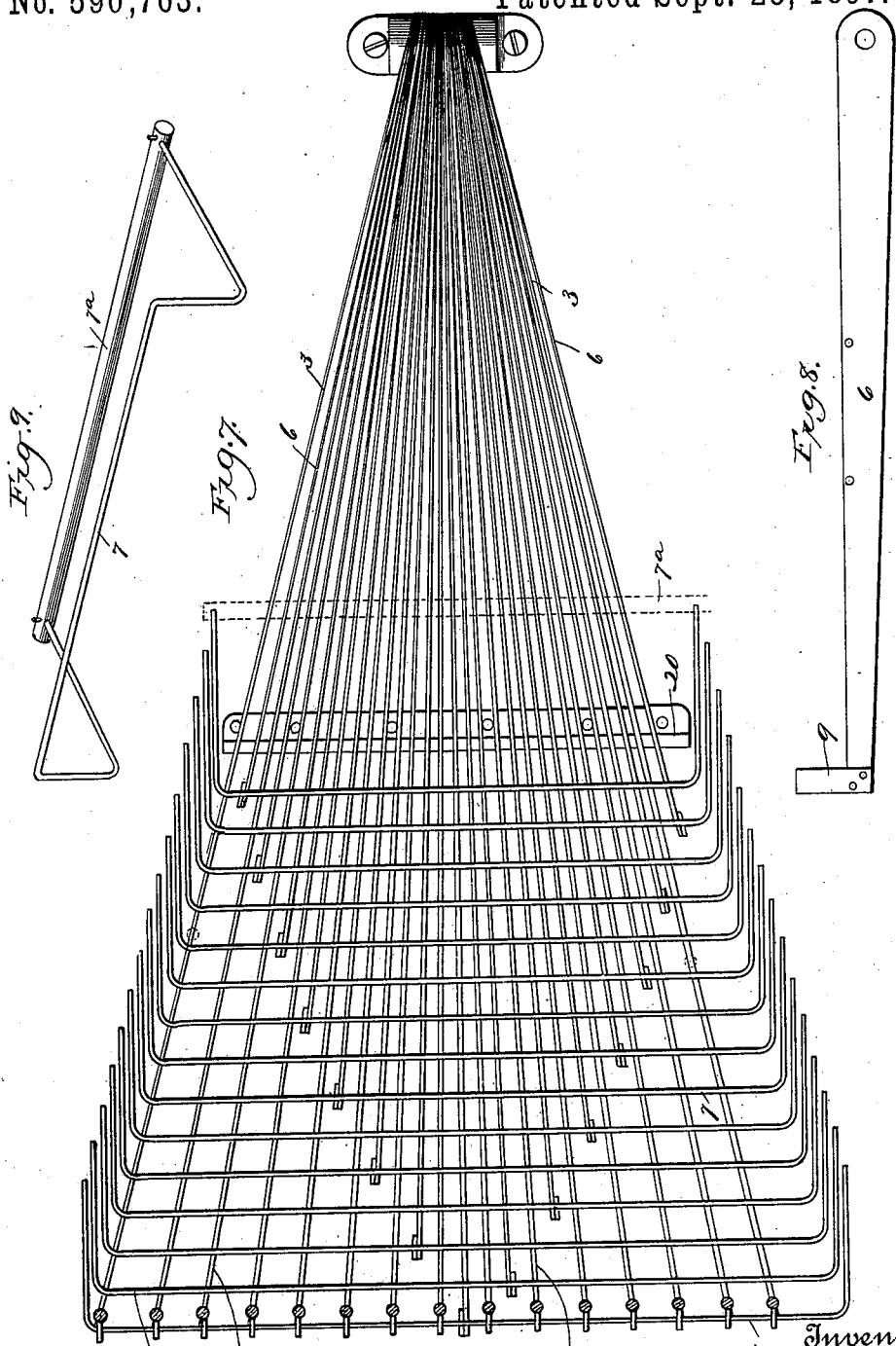

(No Model.) 17 Sheets—Sheet 8.
T. LANSTON.
MACHINE FOR PREPARING PERFORATED RECORD STRIPS OF TYPE FORMING MACHINES.
No. 590,763. Patented Sept. 28, 1897.
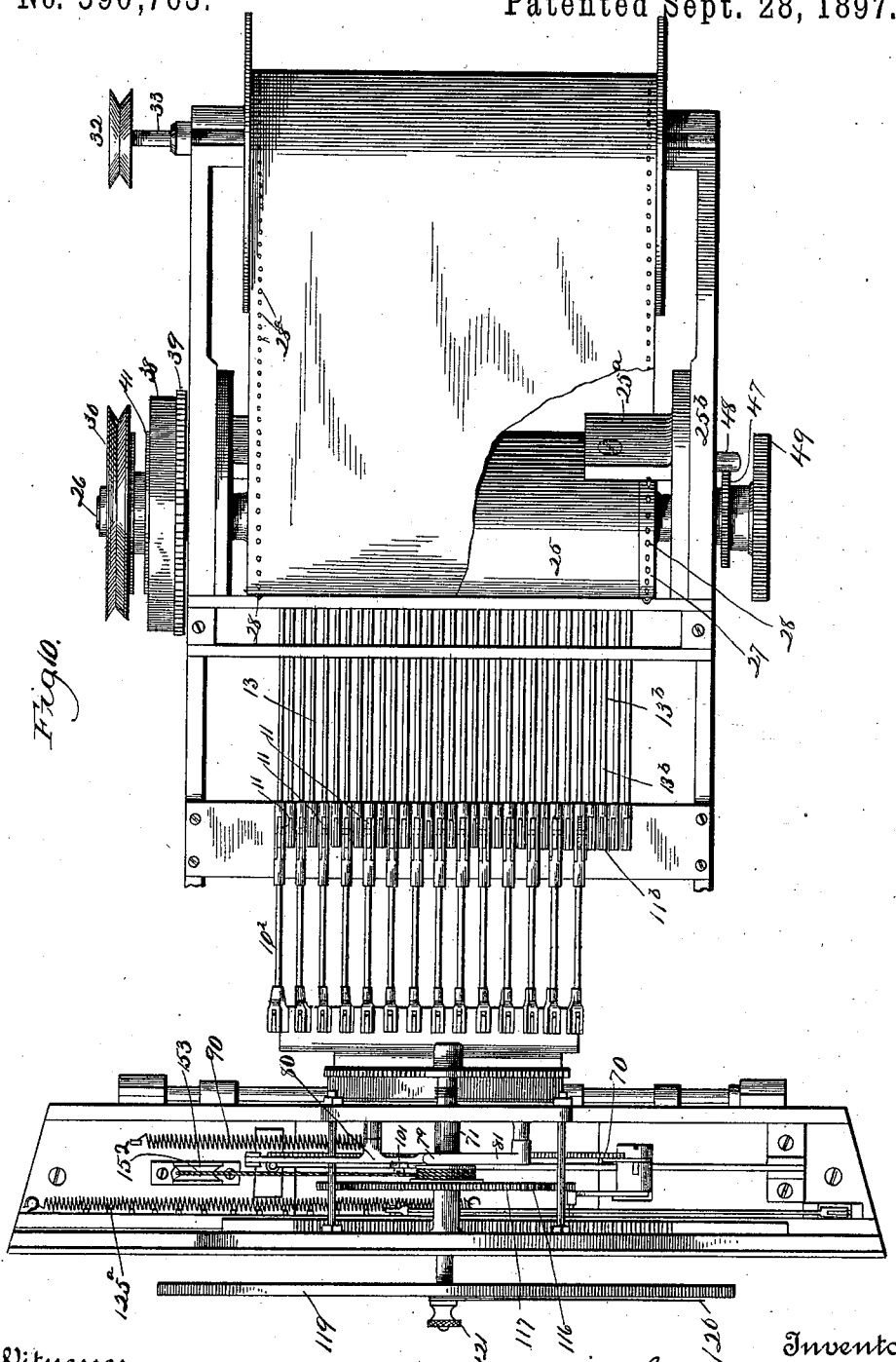

(No Model.)
17 Sheets—Sheet 9.
T. LANSTON.
MACHINE FOR PREPARING PERFORATED RECORD STRIPS OF TYPE FORMING MACHINES.
No. 590,763.
Patented Sept. 28, 1897.
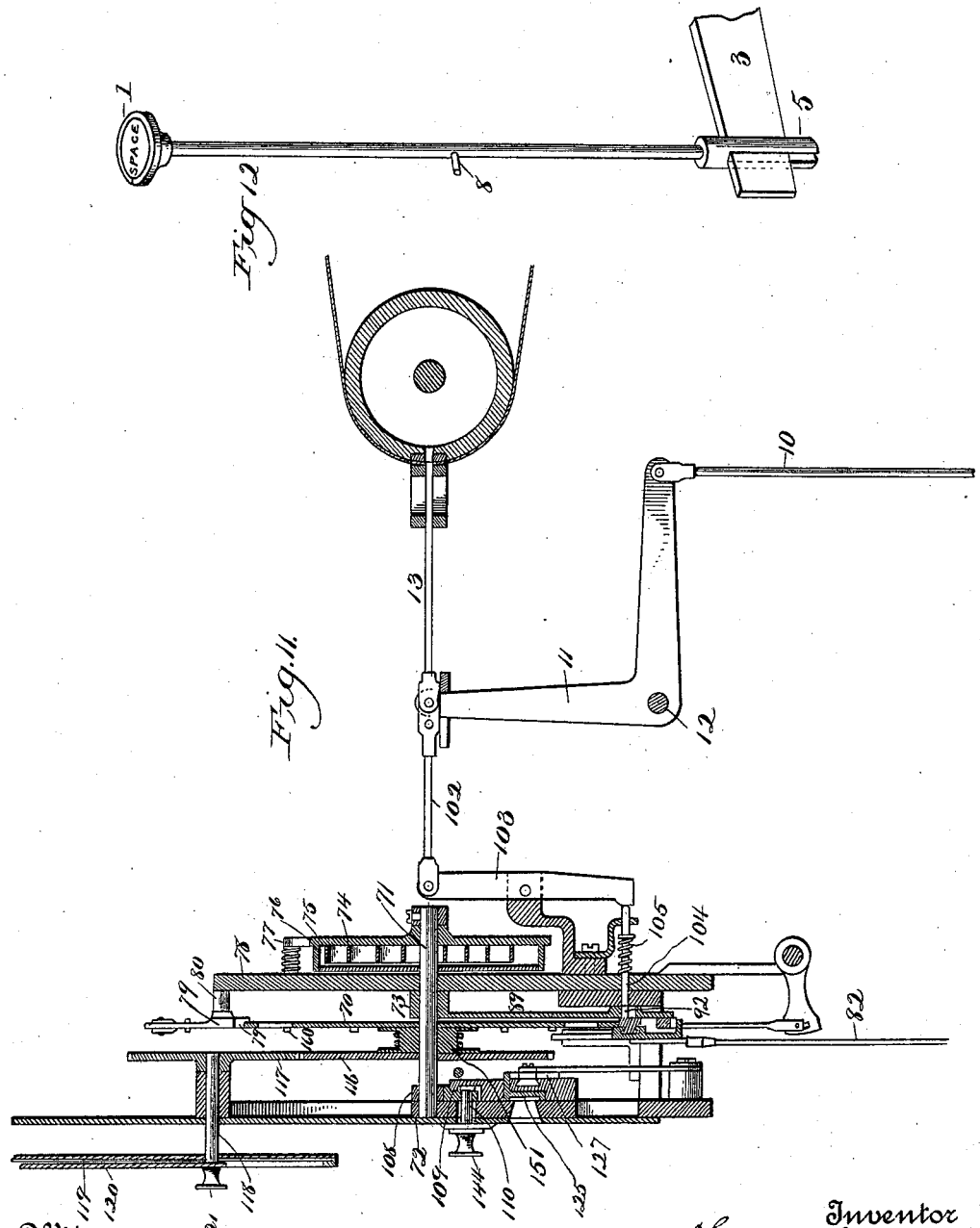

(No Model.) 17 Sheets—Sheet 10.
T. LANSTON.
MACHINE FOR PREPARING PERFORATED RECORD STRIPS OF TYPE FORMING MACHINES.
No. 590,763. Patented Sept. 28, 1897.
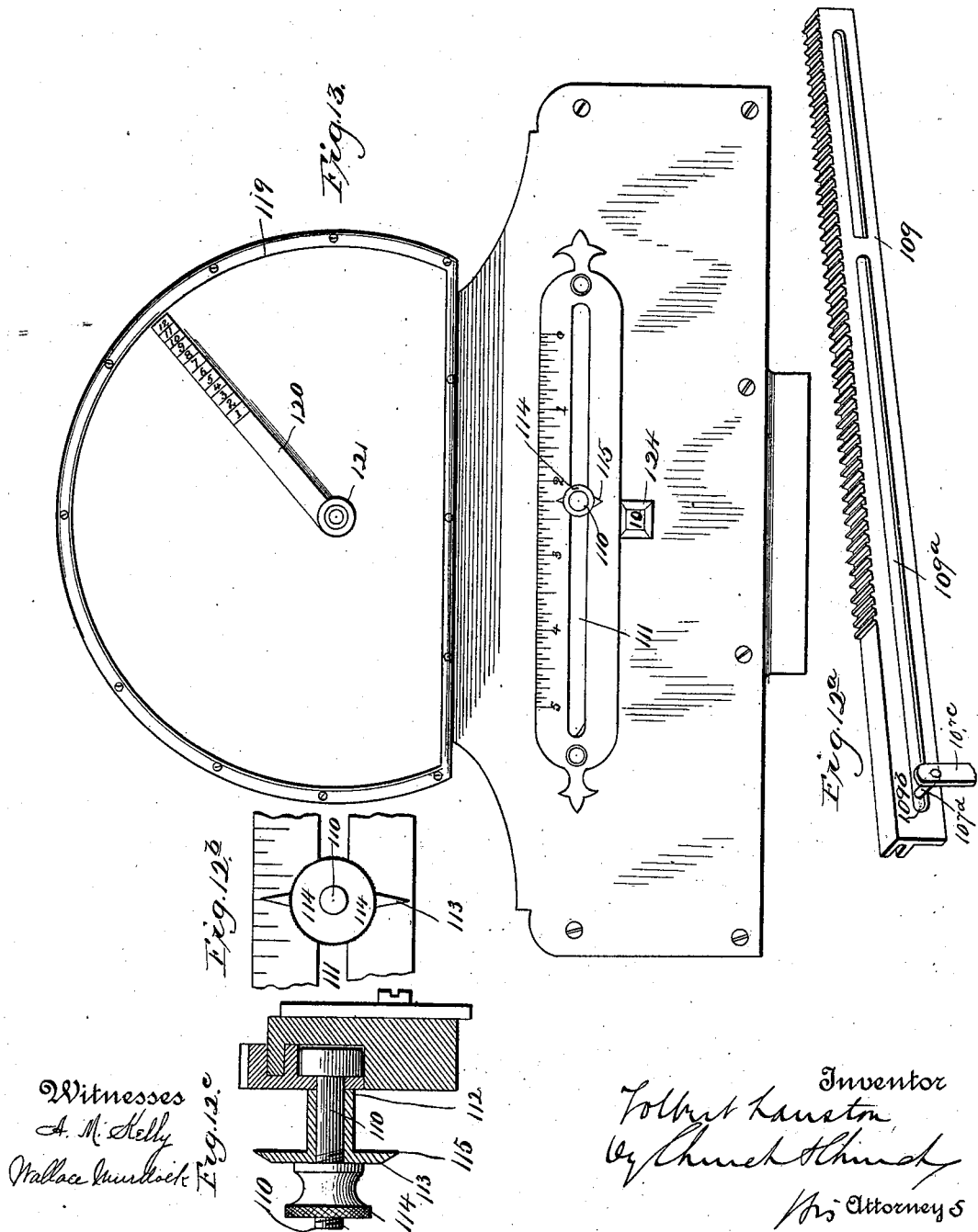

(No Model.) 17 Sheets—Sheet 11.
T. LANSTON.
MACHINE FOR PREPARING PERFORATED RECORD STRIPS OF TYPE FORMING MACHINES.
No. 590,763. Patented Sept. 28, 1897.
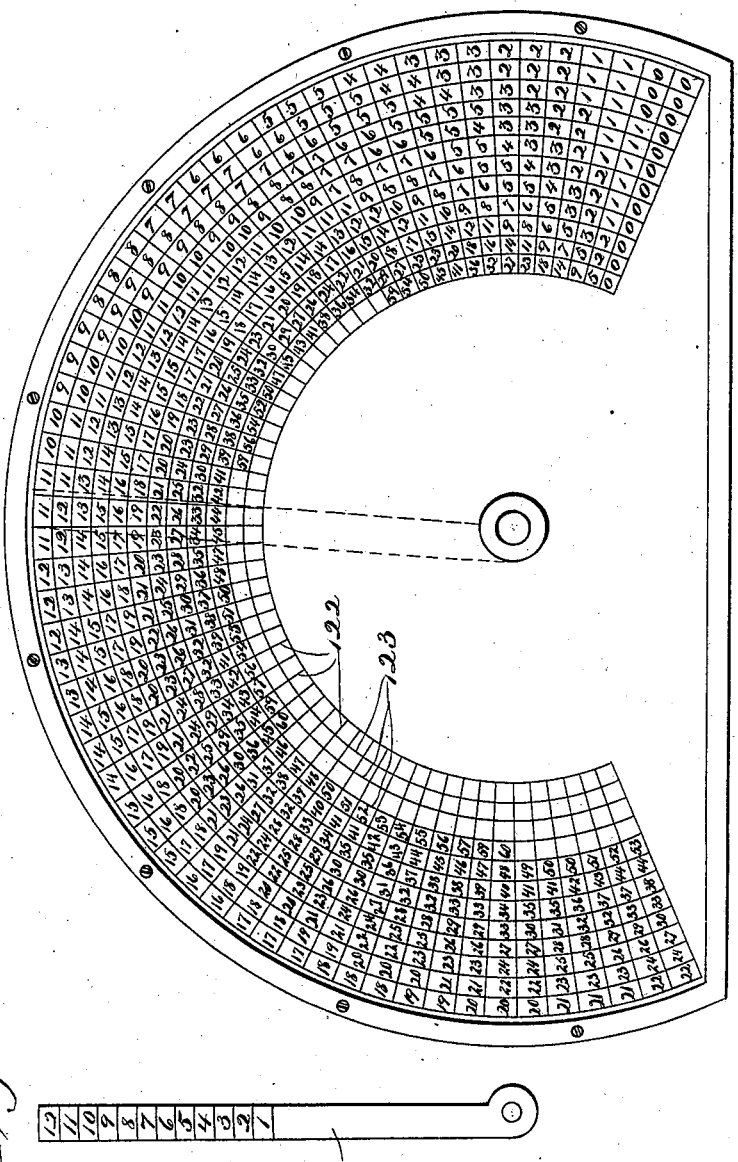
Witnesses:
A. M. Kelly
Wallace Murdock
Inventor,
Tolbert Lanston,
By Church & Church
His Attorneys (No Model.)  17 Sheets—Sheet 12.
T. LANSTON.
MACHINE FOR PREPARING PERFORATED RECORD STRIPS OF TYPE FORMING MACHINES.
No. 590,763.  Patented Sept. 28, 1897.
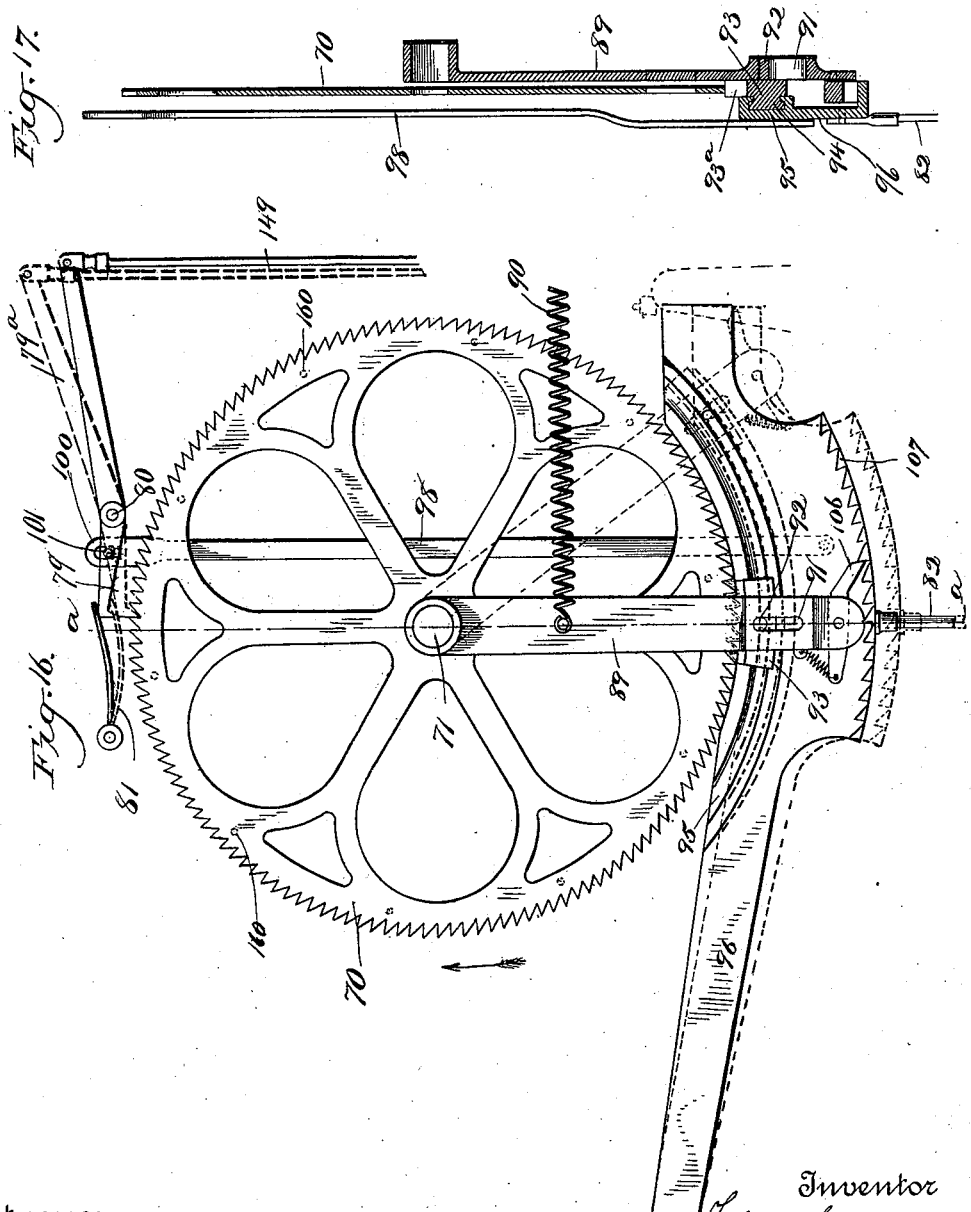

(No Model.) 17 Sheets—Sheet 13.
T. LANSTON.
MACHINE FOR PREPARING PERFORATED RECORD STRIPS OF TYPE FORMING MACHINES.
No. 590,763. Patented Sept. 28, 1897.
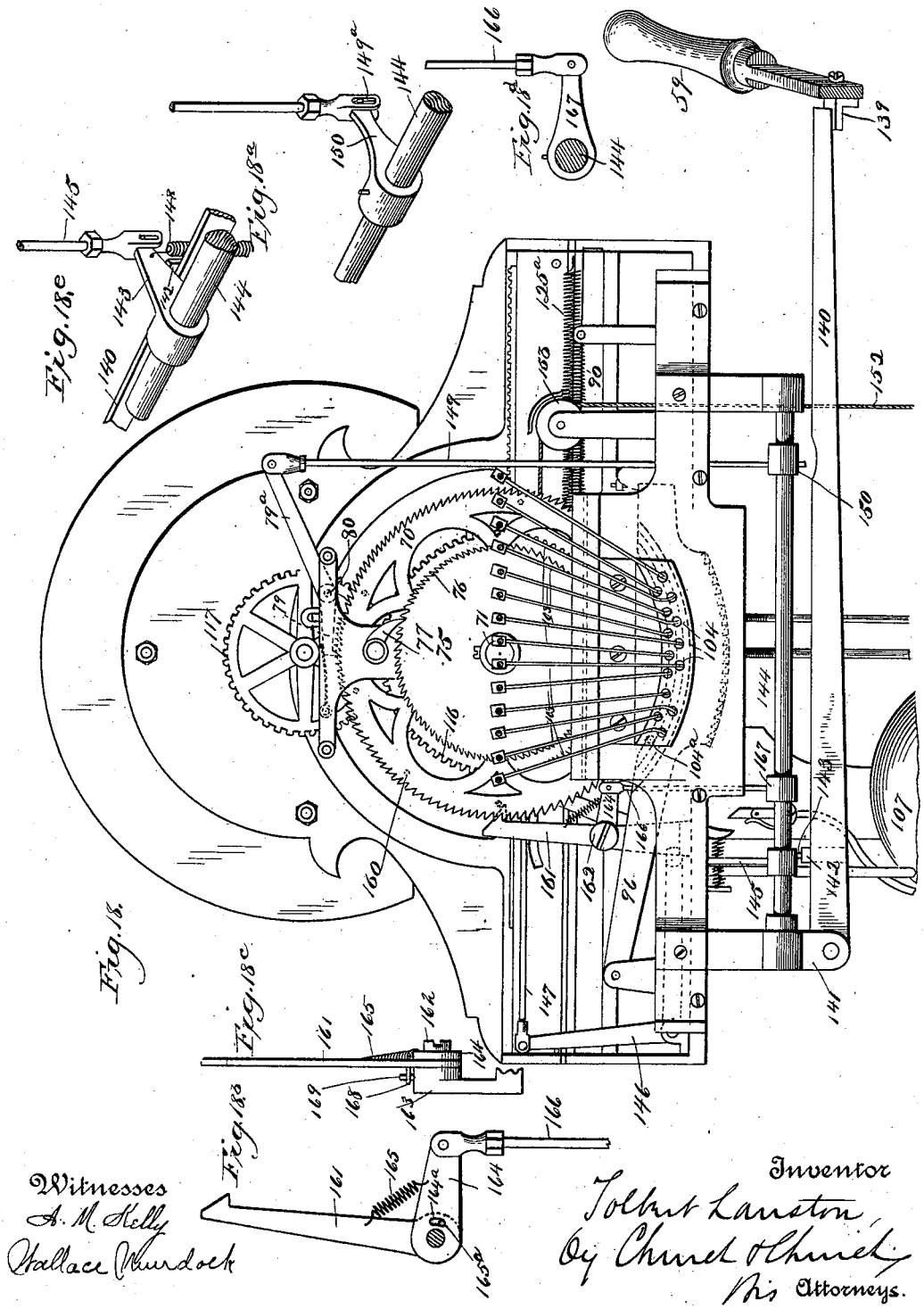

(No Model.)

17 Sheets—Sheet 14.

T. LANSTON.
MACHINE FOR PREPARING PERFORATED RECORD STRIPS OF TYPE FORMING MACHINES.

No. 590,763.

Patented Sept. 28, 1897.

Witnesses
A. M. Kelly
Wallace Murdock

Inventor
Tolbert Lanston
By Church Church
His Attorneys.

(No Model.) 17 Sheets—Sheet 15.
T. LANSTON.
MACHINE FOR PREPARING PERFORATED RECORD STRIPS OF TYPE FORMING MACHINES.
No. 590,763. Patented Sept. 28, 1897.
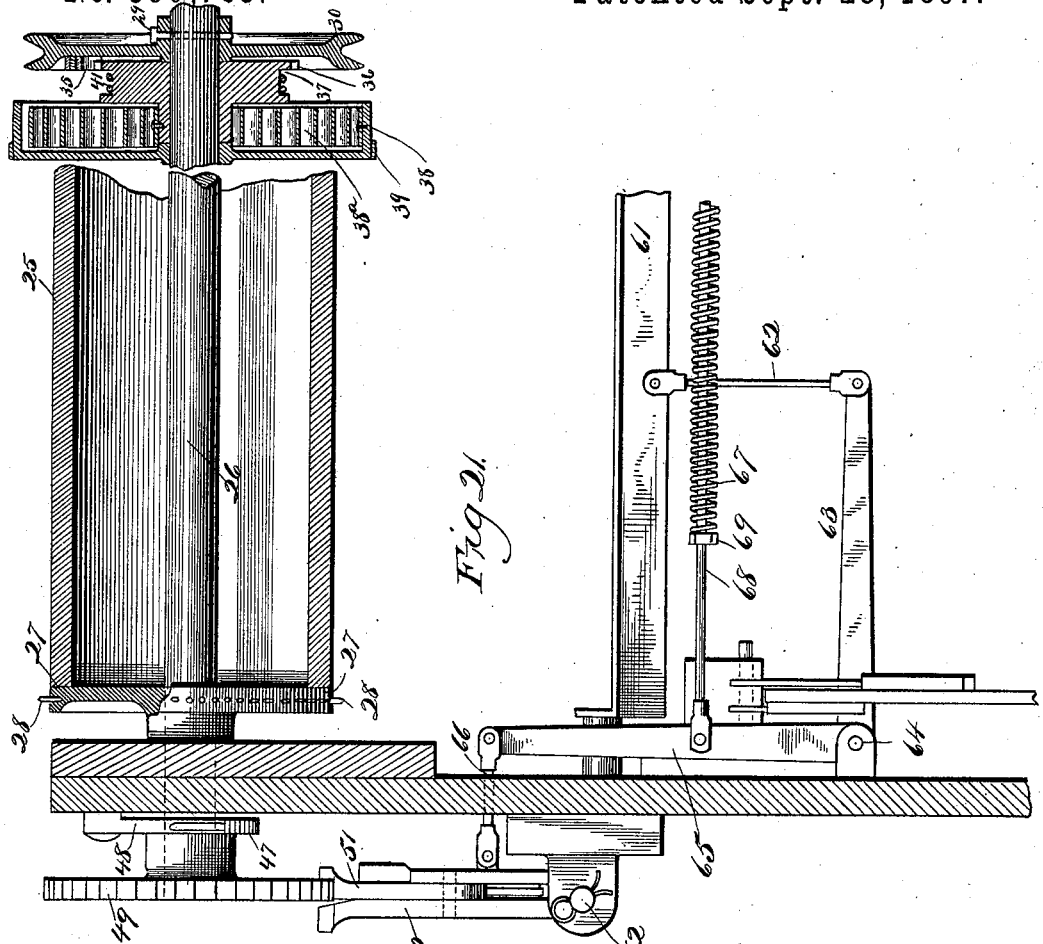
Witnesses
A. M. Kelly
Wallace Murdock
Inventor
Tolbert Lanston,
by Church & Church
his Attorneys.

(No Model.) 17 Sheets—Sheet 16.
T. LANSTON.
MACHINE FOR PREPARING PERFORATED RECORD STRIPS OF TYPE FORMING MACHINES.
No. 590,763. Patented Sept. 28, 1897.
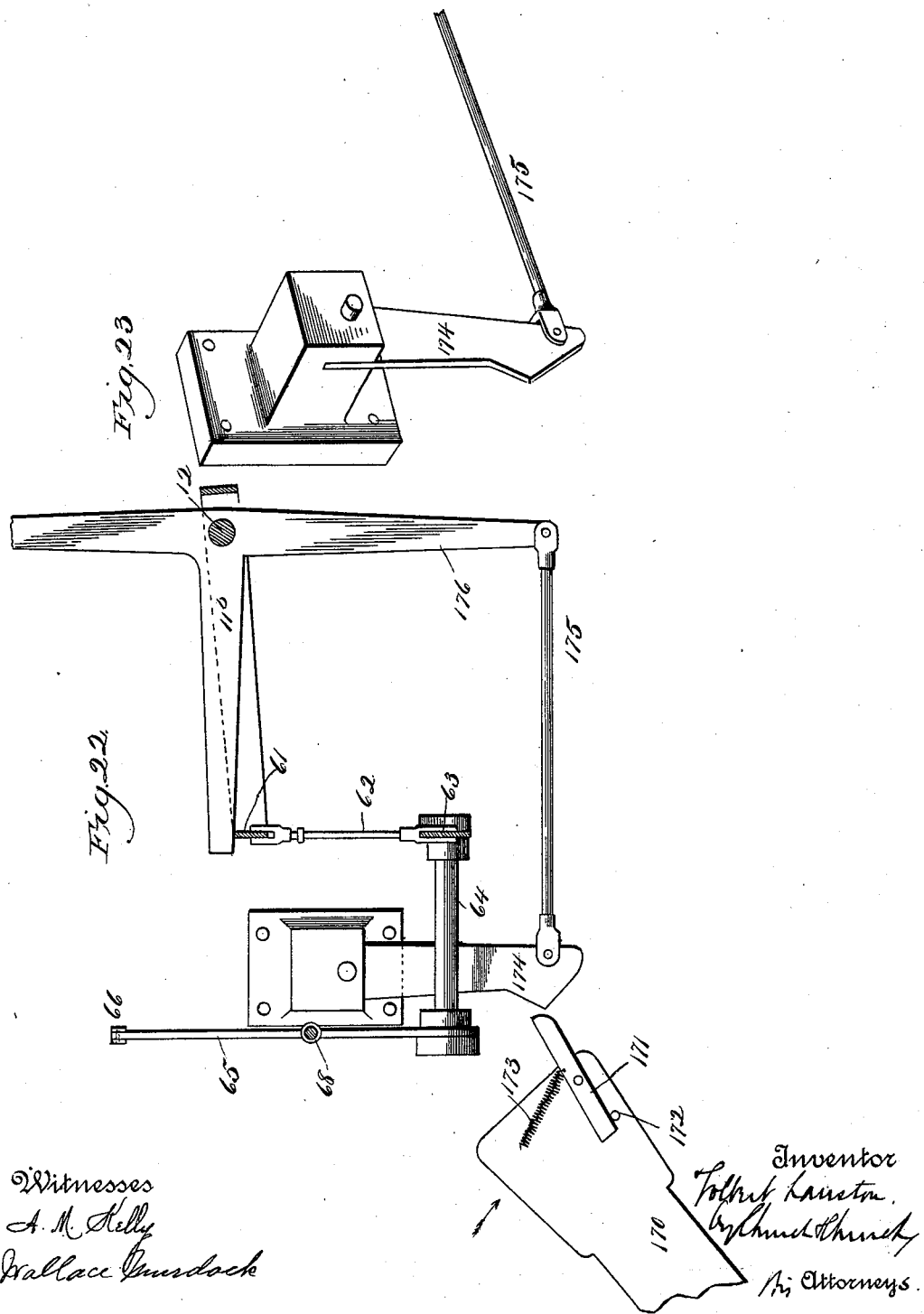

(No Model.) 17 Sheets—Sheet 17.
T. LANSTON.
MACHINE FOR PREPARING PERFORATED RECORD STRIPS OF TYPE FORMING MACHINES.
No. 590,763. Patented Sept. 28, 1897.

Witnesses:
Inventor:

UNITED STATES PATENT OFFICE.

TOLBERT LANSTON, OF WASHINGTON, DISTRICT OF COLUMBIA, ASSIGNOR TO THE LANSTON MONOTYPE MACHINE COMPANY, OF SAME PLACE.

MACHINE FOR PREPARING PERFORATED RECORD-STRIPS OF TYPE-FORMING MACHINES.

SPECIFICATION forming part of Letters Patent No. 590,763, dated September 28, 1897.

Application filed November 30, 1894. Serial No. 530,448. (No model.)

*To all whom it may concern:*

Be it known that I, TOLBERT LANSTON, of Washington, District of Columbia, have invented certain new and useful Improvements in Machines for Preparing the Perforated Record-Strips of Type-Forming Machines; and I do hereby declare the following to be a full, clear, and exact description of the same, reference being had to the accompanying drawings, forming a part of this specification, and to the figures of reference marked thereon.

This invention has relation to means for preparing the perforated record strips or ribbons that are used to control machines for forming justified lines of type according to what is known as the "Lanston monotype system," covered particularly by Letters Patent Nos. 364,521 and 364,523, granted to me June 7, 1887.

In machines that have heretofore been constructed for carrying said method into practice the matrices or dies corresponding to the characters, points, spaces, &c., used in printing have been usually arranged in rows in the form of a square, with, say, fifteen matrices on a side, and the centering of any one of them at the type-casting point has been effected through mechanism operating to shift the "matrix-carrier," as it may be termed, in two directions at substantially right angles to each other, the motion of said carrier in one direction serving to bring one row of matrices in line with the casting-mold, and its motion in the other direction or at right angles serving to bring the particular matrix in that row directly over the mold in position to coöperate with the latter in forming the type.

One or both of the side walls of each of the type-forming molds in said machines has or have been made adjustable in order that the bodies of the majority of the types formed therein might be made of the normal or standard width, set way, and that the bodies of some of the type might be made of abnormal width, so that in the production of types for any given line the space that would ordinarily have to be filled by justification, if types of the normal width were used, might be absorbed or filled out by the bodies of the widened or abnormal types, with the result of producing a perfectly-justified line.

In practice it has been found most convenient to increase the bodies of the space-type only for the purposes of justification, leaving the bodies of all other types of the line of unvaried or normal width.

Inasmuch as the operations of the type-forming machine are automatically controlled by the perforated record-strip, it is obvious that the greatest care and accuracy are required in the preparation of the latter.

According to the preferred plan of preparing the strips each character, point, and space is represented by one or more perforations in the strip or ribbon, said perforations being so disposed and positioned as that their action upon the type-forming machine will cause the particular matrix which it or they represent to be centered over the type-casting mold in position to coöperate with the latter in the production of the designated type.

In addition to the perforations referred to for controlling the formation of normal type the record-strip has punched in it one or more so-called "justifying-perforations," the function of which is to so adjust the type-forming mold when the space-types are to be formed for the particular line as that the bodies of such space-types will be made enlarged or widened in that degree that will cause them to exactly fill out the line when all the types for the line are assembled. The record-strip is also provided with a perforation for controlling the feed of the type-receiving galley in which the justified lines of type are made up, so that the galley may be advanced upon the completion of each line. This galley-perforation precedes in order the perforations which control the formation of type of normal size.

To avoid any confusion, it may perhaps be well to here state that in the use of the perforated record-strip it is fed to the type-forming machine last end first, or, in other words, in such manner as that the perforations in it will be presented to the mechanism of the type-forming machine in the reverse order in which they were made, from which it results that the justifying perforation or perforations for any given line will be first presented, then the perforations controlling the production of the type of normal size, and finally the perforation which effects the feed of the galley.

After producing several machines for preparing the record-strips I have come to the conclusion that a machine for doing such work may advantageously contain the following elements, viz: first, a keyboard provided with keys corresponding to the characters, points, and spaces in the matrix-carrier of the type-forming machine and with other keys representing different justification additions that it may be necessary to add to the bodies of the space-type or other justifying-type to be formed for a line; secondly, punching mechanism so connected and combined with the keys of the keyboard as that when any particular key is depressed one or more punches will be caused to make one or more perforations, and usually two perforations, in the record-strip at the appropriate point or points to effect the desired result of forming the designated normal type or of varying the width of the type-mold for the formation of the space or justifying type, as the case may be; thirdly, mechanism for feeding the paper strip after each perforation or pair of perforations is made therein; fourthly, a line-scale graduated for convenience so as to indicate ems of space and provided with a traveling pointer actuated by the depression of each key for indicating to the operator the filling up of the line and showing as the end of the line is neared how many ems of space remain to be filled by justification; fifthly, a space-counting mechanism for counting and indicating the number of justifying space-type in any given line; sixthly, a justification-indicator which upon the depression of any given key is advanced as many units of space as the character designated by that key would occupy in the line and which indicates upon a dial the number of unfilled units of space left in the "margin of justification," as the space near the end of a line, as indicated by the line-scale pointer, is called, and which also indicates to the operator what justifying key or keys is or are to be struck to effect the addition of the appropriate justifying-fraction to the several justifying space-type in the line, and, seventhly, mechanism which upon the resetting of the parts to normal position after the production of a record for one line will cause a perforation to be made in the strip for effecting the advance of the type-receiving galley one line-space. In the particular machine containing these general features shown in the accompanying drawings are embodied certain principles of construction that it will be well to preliminarily advert to.

In the construction of the keyboard the keys for designating the production of perforations for normal type are, like the matrices of the matrix-carrier of the type-forming machine, arranged in rows in approximately the form of a square, with fifteen keys on each side. The depression of each of these keys is designed to effect the operation of two separate punches, (except as to certain keys to be hereinafter adverted to,) so as to cause the formation of two perforations in the record-strip, one for causing the mechanism of the type-forming machine to shift the matrix-carrier in one direction and the other for causing it to shift said carrier in the other direction, at right angles, in order to center the designated matrix over the type-mold. This double action of each key is brought about by the employment of fifteen long pivoted levers extending longitudinally immediately beneath all the keys and fifteen transverse tilting levers or bails extending transversely under suitable stops or projections upon all the key-stems, the said tilting bails being in turn connected by suitable links with fifteen shorter pivoted levers arranged parallel to the longer longitudinal levers in alternation therewith.

Upon the depression of any given key one of the long longitudinal levers is directly operated and one of the shorter longitudinal levers is indirectly operated through the instrumentality of the appropriate transverse bail, and a punch connected to each of said levers is caused to make a perforation in the record-strip.

Each of the various characters, points, spaces, &c., is assigned a position on the keyboard with reference, first, to its body width, set way, and, secondly, with reference to the comparative frequency of its use. Thus the characters whose type-bodies are of minimum width are arranged in the left-hand longitudinal row, with those of that width most frequently used nearest the front edge of the keyboard, while the characters, &c., of the next width are arranged in the second longitudinal row, and so on throughout the several rows, the keys representing characters of greatest body width being located in the row at the right-hand end of the keyboard.

Although the machine is capable of preparing a record-strip usable in the production of types of any font, I have found it best, if not necessary, to adopt an arbitrary unit of measurement for dealing with each particular font of type.

The machine as represented in the drawings is equipped for dealing with nonpareil type, and the unit of measurement which I have adopted for such type is .0045 of an inch. According to this standard of measurement the types represented by the characters designated on the first longitudinal row of keys in the keyboard are six units or .027 of an inch wide, those in the second row seven units or .0315 of an inch wide, and so on progressively across the keyboard, the fifteenth longitudinal row representing types of the widest size—i. e., twenty-one units or .0945 of an inch wide.

Forming part of what I have hereinabove called the "justification-indicator" is a units-wheel formed so that the space between any two of its teeth represents a unit of measurement. Upon the depression of any key of the keyboard this units-wheel is advanced as many teeth or units of measurement as the character, &c., for which that key stands calls for. Also forming part of this justification-indicator is a dial that is divided off radially into spaces, each of which also represents a unit of measurement, and coöperating with the dial is a pointer or hand that is adapted to be moved over the dial upon the depression of each key as many spaces as the character designated by the key embodies units of measurement.

The number of units displayed upon the dial may be more or less, but it is preferably made to include at least the units in what is called the "justifying-margin," or that part of the line which must be absorbed or filled out by the widening of the justifying space-type.

As has been stated, the line-scale mechanism shows the operator that he is nearing the end of a line and that another word or syllable is inadmissible in that line, the space-counter shows the number of justifying space-types that have been designated for the line, and the radial space on the dial of the justification-indicator alongside the dial-pointer indicates the number of units of space in the justifying-margin remaining to be filled by justification.

It only now remains to so number the dial and its pointer as that the operator may at a glance at the dial and pointer ascertain exactly which of the justifying-keys of the keyboard (the said justifying-keys being arranged, preferably, in a sixteenth longitudinal row at the right of the keyboard) he must depress to perforate the record-strip at the proper point or points to cause the addition of the proper justifying-fraction to the justifying-types. In applying the said numbers to the dial of the justification-indicator the following formula is used:

Let $a$ = the number of justifying space-type in any given line.
$c$ = the number of units of unfilled space in said line.
$d$ = the size of unit for the particular font in thousandths of an inch.
$x$ = scale-figures.

Then $x = \dfrac{cd}{a}$.

The following is a practical application of this formula: Suppose there are ten (10) justifying space-type in a given line, as indicated by the space-counter, and after the key designating the last permissible character in the line has been struck there are twenty units of space in the justifying-margin remaining to be filled by justification, as indicated by the twenty radial unit-spaces on the dial in front of the pointer. Now each space unit, as we have seen, for our nonpareil type is equal to .0045 of an inch. This amount multiplied by twenty, the number of space units disclosed by the dial, will give .09 inches as the space to be filled by justification. This amount divided by ten (10), the number of justifying space-type called for in the line in the case stated, will give .009, which means that each of the ten space-types is to be enlarged nine-thousandths of an inch. Accordingly in the twentieth unit-space of the dial is placed the figure "9" and on the pointer opposite said figure is placed the figure "10." Upon this principle all the numbers on the dial and pointer are applied, thereby rendering it practicable for the operator, when his line-scale shows that he can add no more words or syllables to the line, to first look at his space-counter to ascertain the number of justifying space-types called for by the line, then run his eye along the pointer of the justification-indicator till it finds the number corresponding to the ascertained number of space-type, then read the justifying-fraction on the dial opposite said pointer-number, and, finally, by depressing the appropriate justification key or keys of the keyboard which such justifying-fraction calls for punch the proper perforation or perforations in the record-strip to properly control the justifying mechanism of the type-forming machine.

Pressure upon a suitable lever restores all the parts to normal position and causes a galley-feed perforation to be punched in the record-strip, as before mentioned.

It will be noted that in the preparation of the record-strip the galley-feed perforations, the normal-type-producing perforations, and the justifying-perforations are all formed by a continuous process, requiring no going back or rehandling of the record-strip for any purpose. This is, of course, of the greatest importance, since it economizes time and insures accuracy.

It will also be noted that, so far as the punches used in the designation of normal types are concerned, great economy in numbers is secured, each punch standing not merely for an individual character, &c., but for a whole row of characters, according to the arrangement of the keyboard and the corresponding arrangement of matrices in the type-forming machine. In point of fact, the number of punches required is but double the square root of the total number of keys the action of which they record.

Without any further generalization I will now proceed to a detailed description of the machine shown in the accompanying drawings.

Figure 2:
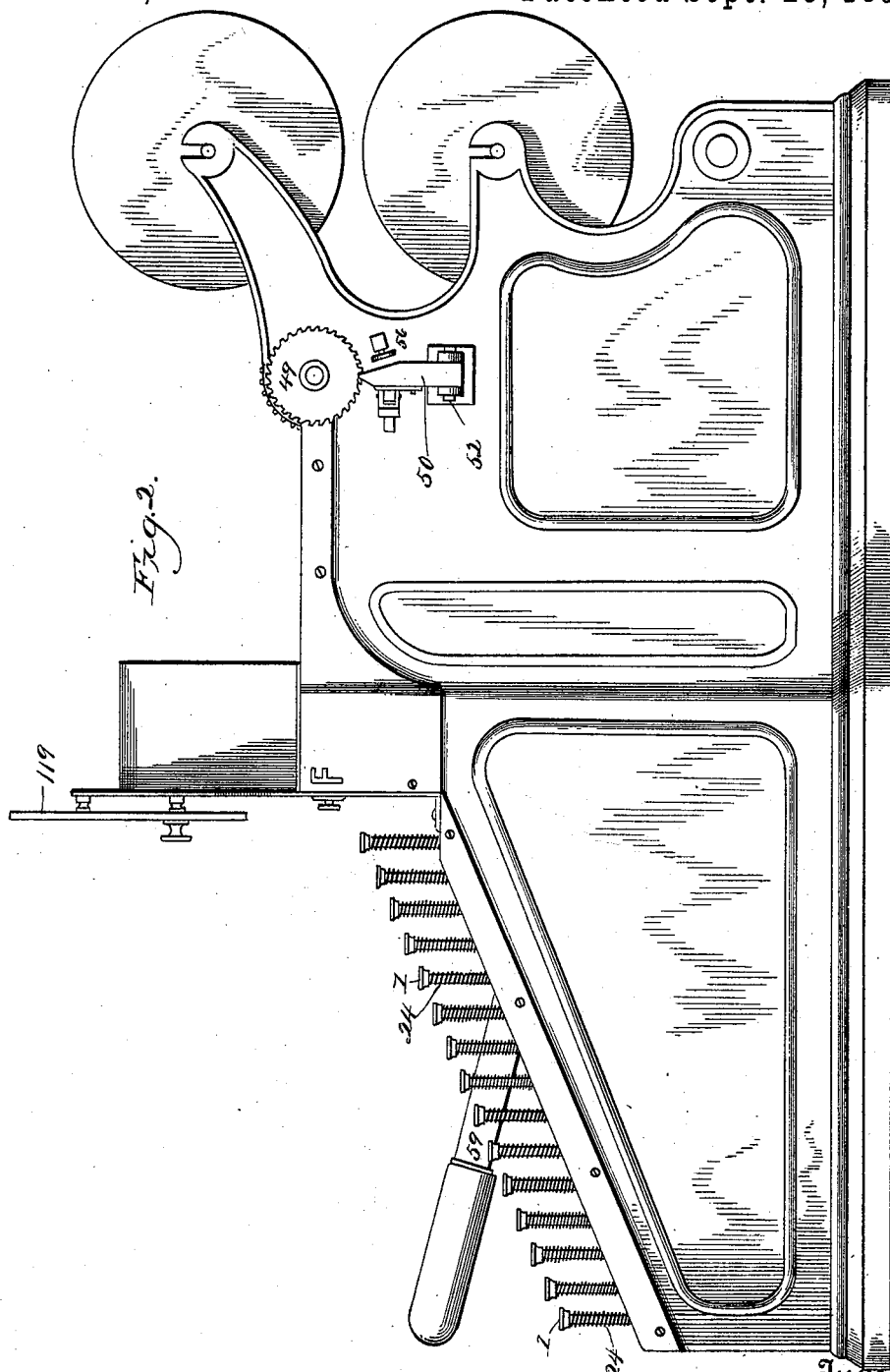
Figure 3:
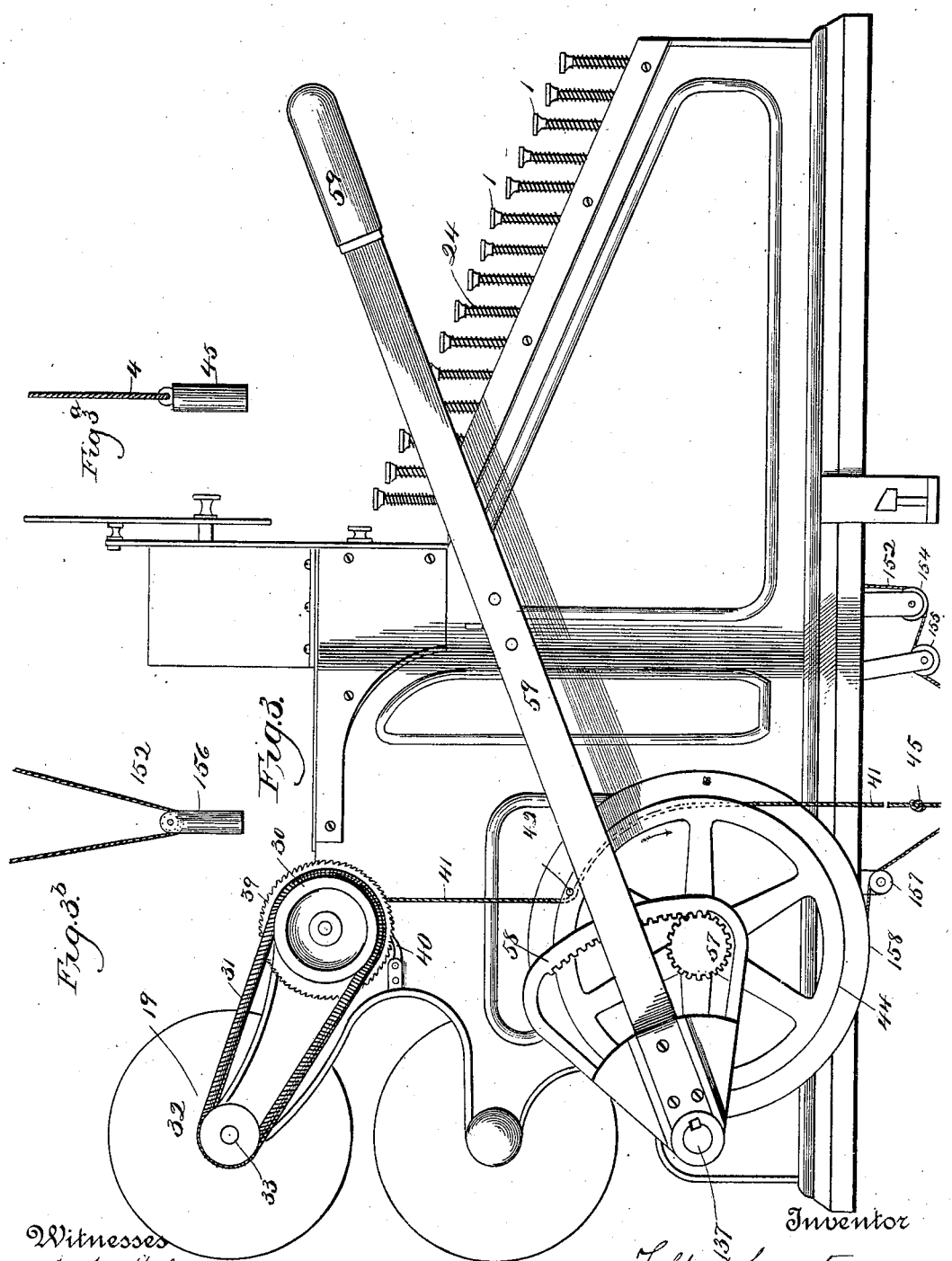
Figure 4:
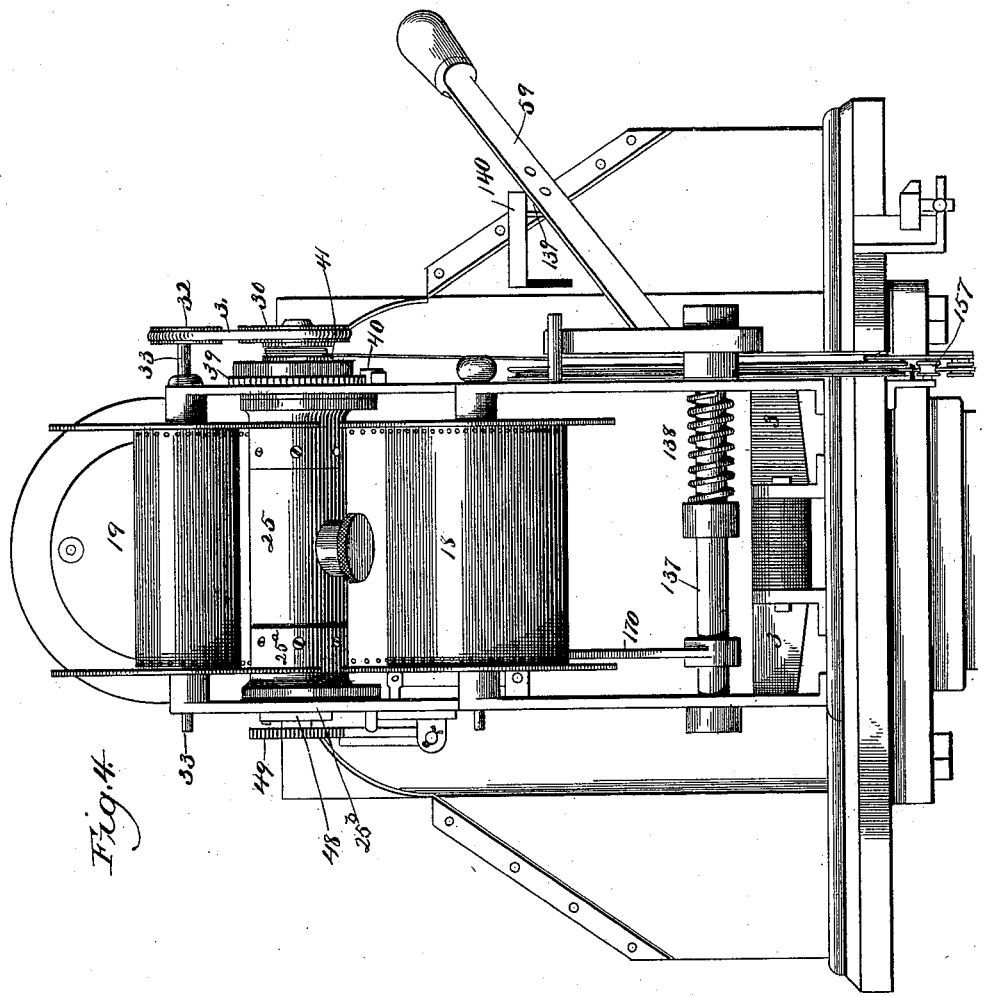
Figure 5:
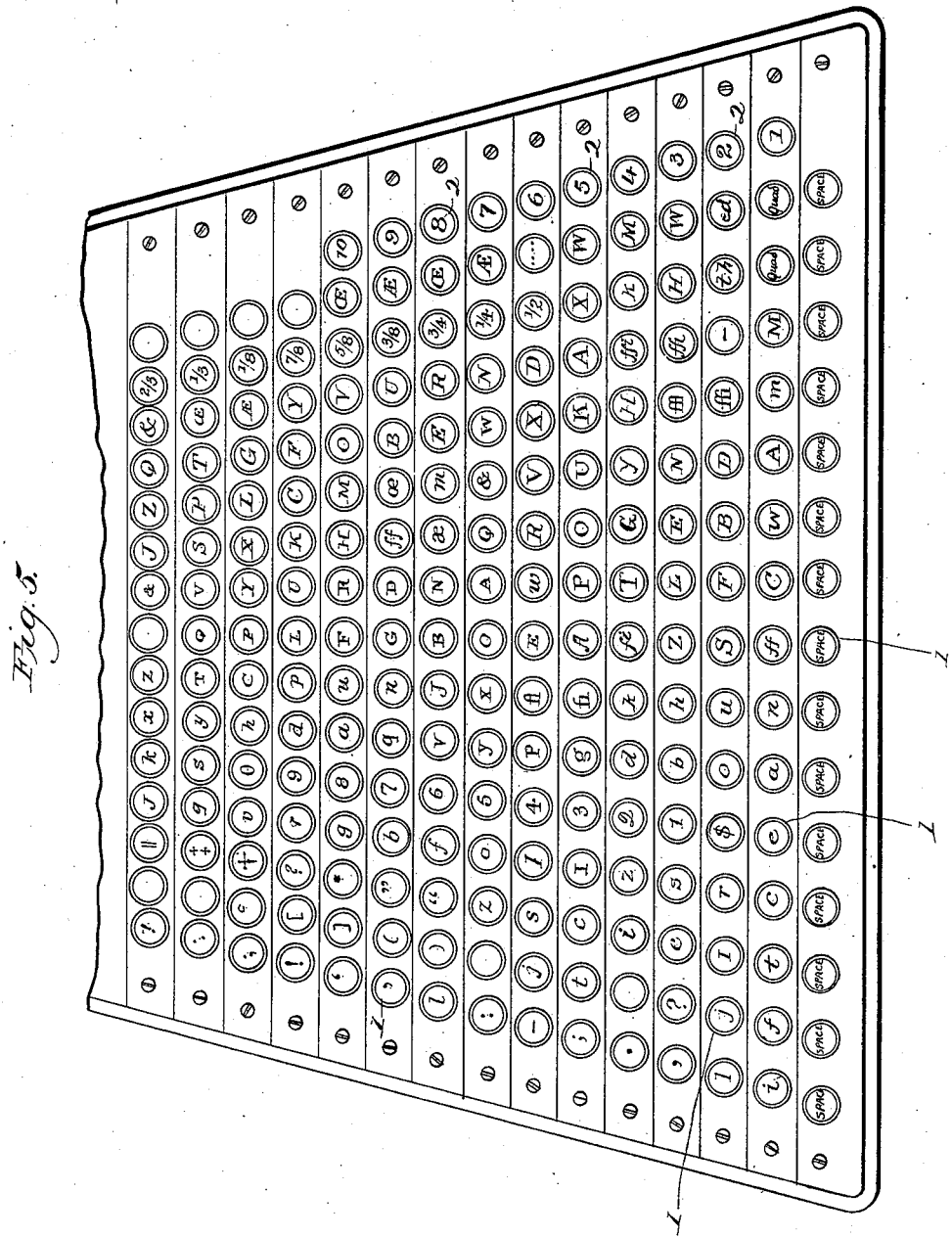
Figure 6:
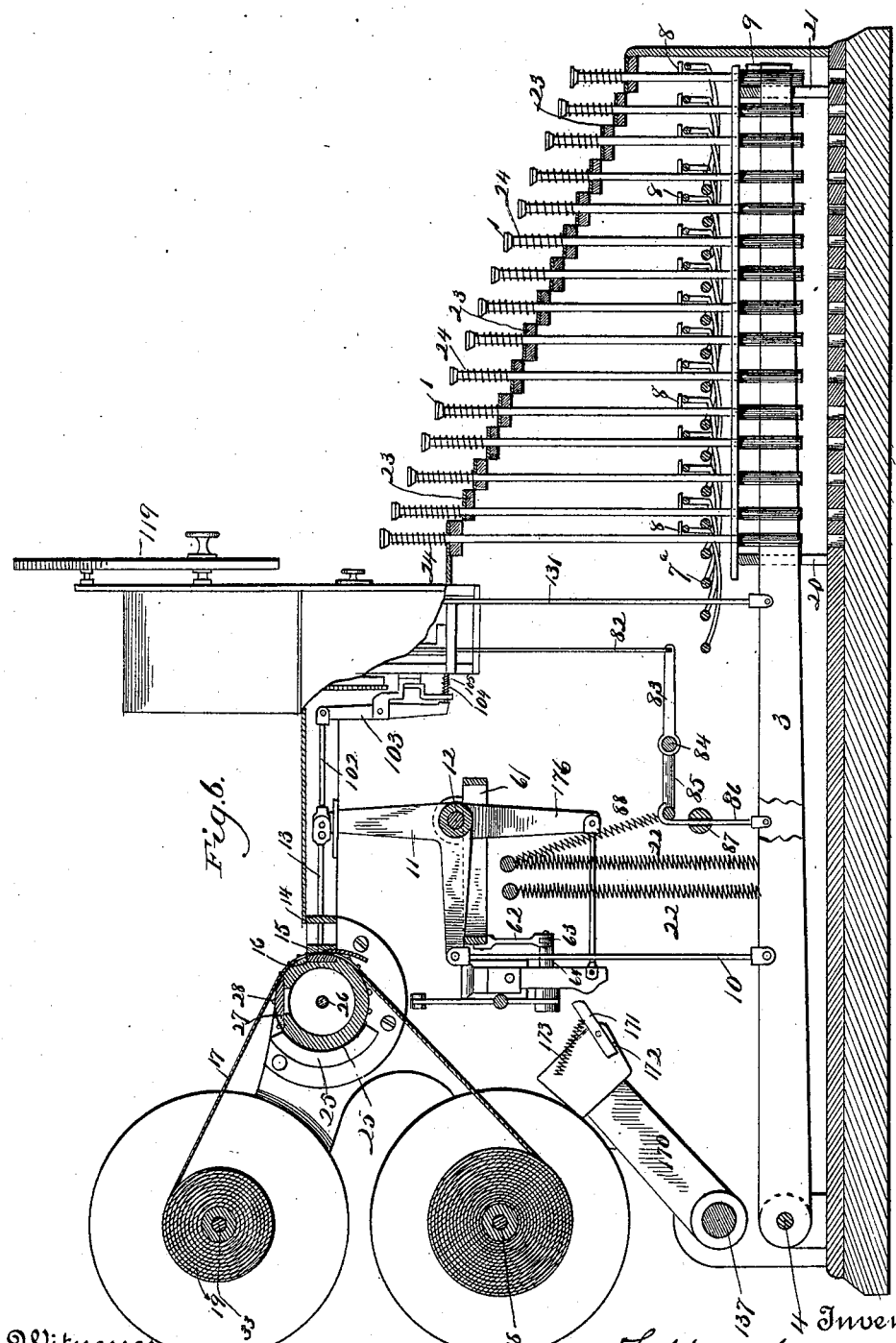
Figure 24:
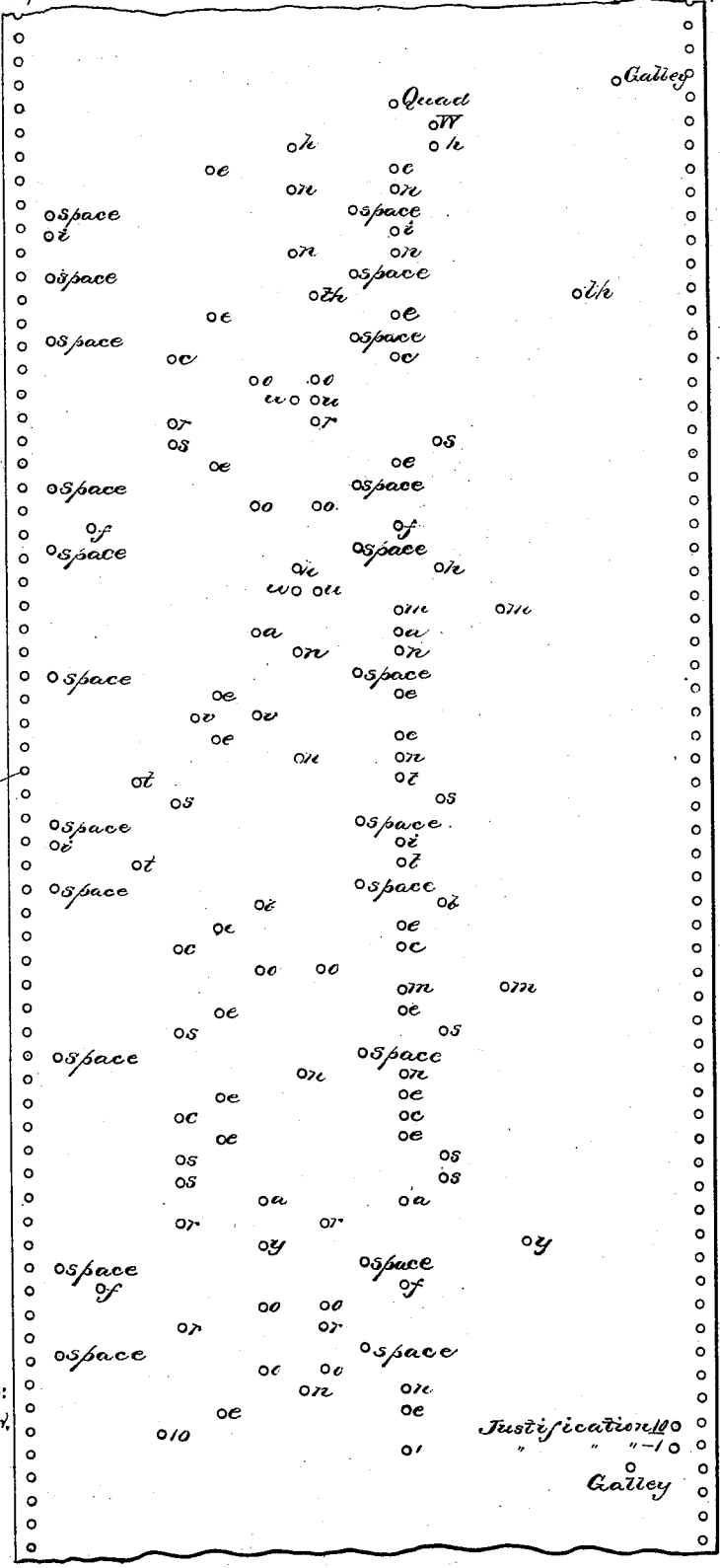

Figure 1 is a top plan view of the machine with a portion of the keyboard broken away. Fig. 2 is an elevation of the right-hand side of the machine. Fig. 3 is a similar view of the left-hand side of the machine. Fig. 3ª is a detail view of a portion of the paper-feed winding mechanism. Fig. 3ᵇ is a detail view of a portion of the mechanism for winding the justification-indicator. Fig. 4 is a rear view of the machine. Fig. 5 is a detached view of the keyboard, showing the arrangement of keys. Fig. 6 is a longitudinal sectional elevation of the machine, designed particularly to show the arrangement of the keys and punching mechanism. Fig. 7 is a plan view showing the relation of the two sets of levers that are operated upon by the keys. Fig. 8 is a side view of one of the short longitudinal levers operated upon by the keys. Fig. 9 is a perspective view of one of the transverse levers or bails which constitutes the medium of connection between the keys and the shorter longitudinal levers of the key-action. Fig. 10 is a top plan view showing particularly the punches, paper-feed mechanism, and the justification-indicator. Fig. 11 is a longitudinal sectional view taken through the justification-indicator, showing also a portion of the punching mechanism. Fig. 12 is a view of one of the keys, showing the manner in which it coöperates with one of the long longitudinal levers of the key-action. Fig. 12$^a$ is a perspective view of the sliding rack of the line-scale mechanism. Figs. 12$^b$ and 12$^c$ are detailed views showing the means for securing the adjustable pointer on the line-scale rack. Fig. 13 is a front view of the line-scale, the space-counter, and the justification-indicator. Fig. 14 is a view of the dial of the justification-indicator detached, showing the manner in which it is laid off and numbered. Fig. 15 is a view of the pointer or hand of the justification-indicator, showing the numbers applied thereto. Fig. 16 is a view of the units-measuring wheel and coöperating parts of the justification-indicator. Fig. 17 is a sectional view taken on the line $a\ a$, Fig. 16. Fig. 18 is a rear view of the justification-indicator. Fig. 18$^a$ is a detail view showing the connection between the rod 149 and the lever or arm 150, Fig. 18. Figs. 18$^b$ and 18$^c$ are detail views of the pawl and connections for arresting the units-wheel when it overthrows during the winding operation. Fig. 18$^d$ is a view showing a detail of the connection between the arm 167 and rod 166, Fig. 18. Fig. 18$^e$ shows the connections between arm 143 and rod 145. Fig. 19 is a view showing details of the line-scale mechanism. Fig. 19$^a$ and 19$^b$ are detail views of the pawl or detent which operates upon the rack of the line-space mechanism. Figs. 20 and 21 represent details of the paper-feed mechanism. Figs. 22 and 23 show certain details of the paper-feed mechanism and also details of mechanism for making the galley-feed perforations in the record-strip. Fig. 24 is a view of the record-strip prepared by my improved machine, a letter or word indicating what each perforation or pair of perforations stands for.

Like numerals in the several figures indicate the same parts.

As shown particularly in Fig. 5, the keyboard is provided with two hundred and twenty-five keys 1, representing the figures, characters, spaces, points, &c., found in a font of nonpareil type. It is also provided with a series of ten keys 2, representing the various justification additions that may be added to the width of the various justifying-spaces that may occur in a given line.

The keys 1 are arranged in rows in substantially the form of a square, there being fifteen keys on a side, as shown.

The keys that are in the first longitudinal row are those which represent characters whose width, set way, occupy the smallest number of units of space according to the unit of measurement adopted—that is to say, the unit of measurement of the nonpareil type being .0045 of an inch, as hereinbefore stated, the characters represented by the said first longitudinal row of keys are six units or .027 of an inch wide, those of the second longitudinal row seven units or .0315 of an inch wide, and so on progressively across the keyboard.

The keys 1 in each longitudinal row are arranged more or less near the front edge of the keyboard, according to the frequency with which they are used in ordinary composition.

The justifying-keys 2 are arranged in a sixteenth longitudinal row at the extreme right of the keyboard, with the one representing the smallest justifying-fraction nearest the front edge of the keyboard—that is to say, the one numbered "1" represents a justifying-fraction of .001 of an inch and the one numbered "2" a justifying-fraction of .002 of an inch, and so on progressively to the one numbered "10," which represents a justifying-fraction of .010 of an inch.

Extending longitudinally beneath the keys are a series of long levers 3, Figs. 6 and 7, which converge at their rear ends, as shown in Fig. 7, and are hung upon a common pivot-pin 4, passing transversely through them, as shown in Fig. 6. These long levers 3 are fifteen in number, one of them extending beneath each longitudinal row of keys. The lower end of the stem of each key is slotted or bifurcated, as shown at 5, Fig. 12, to receive the lever 3 beneath it, the arrangement being such that when any key in a longitudinal row is depressed the long lever 3 beneath that row will be operated.

Extending parallel to the series of long levers 3 and arranged in alternation therewith is a series of fifteen shorter levers 6. I refer to these levers as shorter levers principally to distinguish them from the levers 3, which I have termed "long" levers, but as a matter of fact the central lever 6 is as long as the longest of the levers 3, though all the other levers 6 are of gradually-decreased length from the middle toward the sides of the group of levers, and those at the sides being not much more than half the length of the levers 3.

Extending transversely across the levers 3 and 6 are a series of fifteen pivoted transverse bails 7, each being hung upon its own center or pivot, which consists, preferably, of a cross-shaft 7ª, Fig. 9, arranged to turn freely in bearings on the side walls of the machine.

One of the transverse bails 7, with its shaft 7ª, is shown detached in Fig. 9, and a series of them is shown in Fig. 6. In Fig. 7 the shafts 7ª have been omitted to avoid confusion.

Projecting from the stem of each of the keys 1 is a pin 8, Fig. 12, which extends over one of the transverse bails 7. The pins 8 of all of the keys in each transverse row of keys project above the same transverse bail, so that upon the depression of any key in the row the bail appropriated to that row will be depressed.

Formed upon or secured to each of the shorter levers 6, at or near the outer end of the same, is a vertical projection or finger 9, which extends up beneath one of the transverse bails 7, Figs. 8 and 9. When any key of a transverse row of keys is depressed, the transverse bail beneath that row will be borne down and the particular lever 6 whose finger 9 stands beneath the depressed transverse bail will also be depressed. It will therefore be seen that upon the operation of any of the two hundred and twenty-five keys which stand for the characters, points, &c., some one of the long longitudinal levers 3 will be depressed by reason of the direct action of the lower end of the key-stem upon it, while one of the shorter levers 6 will be simultaneously depressed indirectly through the action of the pin 8 on the key-stem upon one of the transverse bails 7 and the action of the latter upon the vertical finger 9 of the shorter lever.

Each of the levers 3 and 6 is connected through a suitable rod 10, Fig. 6, to a bell-crank lever 11, mounted so as to turn freely upon a shaft 12. The upper arm of each of these bell-cranks 11 has connected to it a horizontal punch 13, that is guided in suitable guides 14 15 and is adapted to coöperate with a suitable opening in a stationary die-plate 16 to punch a perforation in the record-strip 17, Fig. 6, that is wound from a reel or spool 18 onto another reel or spool 19.

Both series of levers 3 and 6 are guided and preserved in their proper relative positions by means of a transverse guide 20, Fig. 6, while the outer ends of the long levers 6 are also guided in another slotted transverse guide 21, as shown in the same figure.

Each of the levers 3 and 6 is provided with a spring 22, Fig. 6, which operates to hold the levers normally raised into horizontal position, as shown in said last-mentioned figure. Each of the keys 1 between its head and its upper guide 23 is surrounded by a spiral spring 24, Figs. 2, 3, and 6, which operates to keep the keys normally elevated and to return them when they are depressed and released.

In order to feed the paper after each perforation or pair of perforations has been punched therein, I provide the following mechanism:

The die-plate 16, with which the punches 13 coöperate to punch the paper, is inserted in or forms a part of a stationary cylinder 25, Figs. 4, 6, and 21, that is rigidly secured by screws or otherwise to brackets 25ª, that are in turn secured to a portion 25ᵇ of the framework of the machine, as shown in Figs. 1, 4, 6, and 10. Extending through this stationary cylinder is a shaft 26, which is secured to two disks 27, that fit closely against the ends of the cylinder 25 and are provided with peripheral pins or teeth 28, Figs. 6, 10, and 21, that are adapted to engage corresponding feeding-perforations 28ª provided in the record-strip. To the left-hand end of this shaft 26, looking from the front of the machine, is secured by a pin 29, Fig. 21, a wheel 30, Figs. 3, 10, and 21, whose periphery is grooved to receive a belt or band 31, Fig. 3, that passes around a grooved pulley 32 on the end of the shaft 33, Fig. 1, supporting the upper paper reel or spool 19, upon which the record-strip is wound after receiving the record-perforations. The grooved wheel 30 has secured to its inner side by means of a screw or pin 34 a pivoted pawl 35, Fig. 21, which is adapted to engage with ratchet-teeth 36 of a wheel 37, loosely mounted upon the shaft 26. The hub of this wheel 37 extends within a drum 38, having peripheral ratchet-teeth 39, also mounted loosely upon the shaft 26, but restrained from moving with said shaft by the engagement of a spring-pawl 40, mounted upon the stationary part of the framework, as shown in Figs. 3 and 4. Within the drum 38 is arranged a coiled spring 38ª, which is connected at its outer end to the said drum and at its inner end to the hub of the wheel 37. The central portion of the wheel 37 is grooved to receive a cord or chain 41, one end of said cord or chain being connected to the wheel and the other end passing downward and through a suitable eye or guide 42 on a winding-wheel 44 and having secured to its extremity a weight 45. (Shown in Figs. 3 and 3ª.)

The cord or chain 41 is provided with a knot or stop below the eye or guide 42 on the winding-wheel, and when the winding-wheel is turned in the direction indicated by the arrow, Fig. 3, the knot or stop 45 brings up against the said guide 42 and causes the cord to wind up in the groove of the wheel 44, thereby drawing upon the cord and causing it to rotate the wheel 37 and the latter to wind up the spring 38ª.

As the wheel 37 is rotated by a pull upon the winding-cord its ratchet-teeth 36 slip past the spring-pawl 35 on the grooved wheel 30, the said wheel 30 and the shaft 26, to which it is secured, being kept relatively stationary by the engagement of a ratchet-wheel 47, fixed to the shaft 26 near its right-hand end, Figs. 4 and 21, with a spring-pawl 48, mounted upon the stationary framework. Also secured rigidly to the right-hand end of the shaft 26 is the ratchet escapement-wheel 49, Figs. 1, 2, 4, and 21, with which are adapted to coöperate two vibrating pawls 50 and 51. The pawl 50 is hinged upon a pin 52, as shown in Figs. 2, 20, and 21, and is adapted to vibrate backward and forward in the same plane toward and from the escapement-wheel 49 and to pass through between two of the teeth of said wheel in so moving. The pawl 51 is hinged on an axis or pin 53, which extends at right angles to the pin or axis 52 of the pawl 50, and a spring 54, Fig. 20, applied to the pawl 51, tends to throw the upper end or point of the latter out of line with the upper end or point of the relatively-fixed pawl 50.

A friction-roller 55 serves to diminish the friction upon the bearings of the pawl 50 during the vibrations of the latter, and an adjustable stop 56 limits the degree of lateral motion of the movable pawl 51.

The tendency of the spring 38$^a$ is to rotate the shaft 26 and the escapement 49 connected thereto in the direction indicated by the arrow, Fig. 20.

Normally the pawls 50 51 are swung outward with the spring-pressed or what may be termed the "limber-pawl" 51 in engagement with the escapement-wheel. In this position the ends of both of the pawls stand in line, as indicated by the full lines in Fig. 20.

Upon the pawl 50 being moved inward so as to engage its upper end between the teeth of the escapement-wheel the limber-pawl will pass out of engagement with said teeth and its spring 54 will throw it to the right, so as to carry its end out of line with the pawl 50, as shown by the dotted lines, Fig. 20, and cause it to pass into line with the space in front of the next tooth, and when both pawls are swung outward the point of the pawl 50 will become disengaged from the escapement-wheel, while the pawl 51 will pass into engagement therewith, and the spring which rotates the escapement-wheel being stronger than the spring 54 which holds the pawl outward against the stop 56, said pawl 51 will be turned by the wheel upon its pivot until it again comes into line with the relatively-fixed pawl 50. By this arrangement of mechanism the escapement-wheel is permitted to advance the distance between two teeth at each complete vibration of the two pawls.

A convenient means for giving rotation to the winding-wheel 44 consists of a pinion 57, Fig. 3, formed upon or secured to the hub of the winding-wheel, and a curved rack or sector 58, secured to a hand-lever 59, pivoted at 137, whose handle extends forward alongside the keyboard in position to be conveniently grasped by the operator.

One depression of the lever will wind the spring 38$^a$ sufficiently to cause it to restore the tension lost in feeding the record-strip while the perforations are being made in it in designating the characters, &c., for a whole line.

The initial tension of the spring may be regulated by turning the drum 38, Figs. 10 and 21, the pawl 40 serving to lock said drum in the position to which it is turned.

Pivoted upon the same shaft 12, Fig. 6, which forms the axis of the bell-crank levers 11 is a yoke or bail 61, whose outer portion extends transversely beneath all the lower arms of said bell-crank levers 11, so that upon the operation of any of said bell-crank levers by the depression of a key the said yoke or bail will be swung downward and through the instrumentality of a link 62, Figs. 21 and 22, lever 63, shaft 64, lever 65, and rod 66 cause the feed-pawls 51 and 52 to be swung inward, and upon the release of the key the parts will be caused to resume their original positions by the expansion of a spring 67, operating upon the lever 65 through a rod 68 and a collar 69 upon said rod, as shown in Fig. 21.

From the foregoing description it is clear that when any key of the keyboard is depressed punches 13, corresponding to the levers 3 6, operated by said key, will be driven through the record-strip 17, and as the key and levers 3 6 return to normal positions the feeding-pawls 50 51 will permit the escapement-wheel 49 to advance one tooth, thereby causing the feed-wheels 27, whose pins 28 are in engagement with the feeding perforations 28$^a$, Figs. 10 and 24, of the record-strip to feed or advance the record-strip so as to bring a blank space opposite the line of punches in position for receiving the next perforations in response to the next key actuated. It is also clear that the depression of the operating-handle 59 at any time will restore the tension of the spring 38$^a$ of the feeding mechanism.

The Line-Scale Mechanism.

Having now described the mechanism for perforating and feeding the record-strip, I will next describe the line-scale mechanism.

The line-scale mechanism and the mechanism of the justification-indicator are very intimately connected, and the action of each is controlled by the movements of what I term the "units-wheel." This units-wheel is designated in the drawings by the number 70 and is shown best in Figs. 16 and 17, and is also shown in Figs. 10, 11, and 18. As shown in Figs. 10, 11, and 18, it is secured rigidly upon a shaft 71, which I term the "units-wheel shaft," and its periphery is provided with ratchet-teeth, as shown in Figs. 16 and 18. The units-wheel shaft 71 is mounted in fixed bearings 72 73, Fig. 11, so as to turn freely therein. Secured to this shaft near its rear end is the inner end of a spring 74, the outer end of said spring being secured to a drum or casing 75, which is mounted loosely upon the shaft 71, but is normally prevented from turning thereon by reason of the engagement of one or the other of its peripheral ratchet-teeth 76, with a spring-pawl 77, mounted upon a fixed portion of the framework 78. (Shown in Figs. 11 and 18.) By turning the drum 75 so that its ratchet-teeth will slip past the pawl 77 the initial tension of the spring 74 may be adjusted.

The shaft 71 and the units-wheel mounted thereon are normally prevented from being revolved by the spring 75 by the restraining action of the pawl or detent 79, pivoted at 80 to the stationary framework of the machine and held in engagement with the teeth of the units-wheel by a spring 81, as shown in Fig. 16.

Mounted upon the units-wheel shaft so as to turn freely is an arm 89, which has connected to it a spring 90, Figs. 10 and 16, which tends to keep the arm in the position indicated by the dotted lines in Fig. 16. In this arm 89, near the outer end, is a longitudinal slot 91, Figs. 16 and 17, in which is adapted to play a pin or stud 92, projecting from a block 93, that is formed with a tooth or teeth 93$^a$, that is or are adapted to engage with one or more teeth of the units-wheel when said block is moved so that its pin or stud 92 is at or near the inner extremity of the slot 91. As shown in Fig. 17, the block 93 is provided with a dovetailed projection 94, which fits within a corresponding dovetailed circular recess 95, formed in a lever 96, arranged below the units-wheel and pivoted at one end at 97, as shown in Fig. 16. A rod 98 is connected at its lower end to the swinging lever 96 and at its upper end is provided with a slot 100, which is adapted to receive a pin 101, Fig. 16, projecting laterally from the side of the pawl or detent 79.

Whenever the lever 96 is raised so as to cause the tooth 93$^a$ of the block 93 carried by it to engage with the teeth of the units-wheel, the detent or pawl 79 at the top of the units-wheel will, through the instrumentality of the rod 98 and pin 101, be lifted out of engagement with the units-wheel, thereby releasing the latter and permitting it to revolve in the direction indicated by the arrow, Fig. 16, carrying with it the arm 89, the block 93, with which the arm is engaged, sliding through the curved guide 95 of the lever 96, as will be understood by an inspection of Figs. 16 and 17.

The requisite vertical swinging motion is imparted to the bar 96 from the key-levers 3 in the following manner: The said bar 96 has connected to it a rod 82, Figs. 6, 16, and 17, whose lower end is connected to the lever 83, mounted on the cross-shaft 84, Fig. 6. Also connected to the shaft 89 so as to rock with it is a yoke or bail 85, which extends across the machine beneath a series of hooked rods 86, connected to the series of longitudinal key-bars 3, there being a hooked rod 86 for each of the several bars 3. The proper relative positions of the hooked rods 86 are preserved by means of a transverse guide 87 through which the hooked bars pass, as shown in Fig. 6. A spring 88 is connected to the yoke or bail 85 and holds the latter normally up in engagement with the hooked bars. It is apparent from this construction that when any key-bar 3 is depressed its hooked bar 86, acting upon the yoke or bail 85, will turn the shaft 84 and through the lever 83 and connecting-rod 82 will raise the swinging lever 96 and cause the engagement of the teeth 93$^a$ of the block 93 with the teeth of the units-wheel. Now it is evident that if the several keys of the keyboard can be made to arrest the swinging arm 89 (when thus engaged with the units-wheel) at different distances from the normal or starting point corresponding to the different widths, set way, of the several type indicated by the keys, the successive advances of the units-wheel and its shaft can be employed for operating mechanism for indicating both the relative fullness of the line for which types are being designated and the number of space units remaining in the line to be filled by justification. To this end I arrange that the distance between each two teeth in the units-wheel shall represent the unit of space by which all the types of the font are to be measured, and I assign to each key a value in space units.

Upon releasing the units-wheel from the pawl 79 I arrange to arrest it after its travel a number of units corresponding to the number of units represented by the character on the key depressed in the following manner: As all the types composing the font are classified in a series of fifteen sizes, representing fifteen different body widths, set way, it is only necessary that provision be made for arresting the units-wheel in fifteen different positions. Accordingly I connect to each of the bell-crank levers 11, that is controlled by a lever 3, Figs. 6, 10, and 11, (except the last or fifteenth one,) a rod 102, which rod in turn is connected to the upper end of a centrally-pivoted lever 103, whose lower end abuts against a horizontally-moving stop or pin 104, provided with a retracting-spring 105, as shown in Fig. 11.

Upon the depression of any longitudinal key-lever 3 the upper end of the bell-crank lever 11 will be moved to drive the punch 13 through the record-strip, and in so moving will draw upon the rod 102 to swing the centrally-pivoted lever 103 and force outward the pin 104 into the path of the swinging arm 89. The projection of the pin 104 takes place in point of time before the engagement of the teeth 93$^a$ of the block 93 with the units-wheel and the disengagement of the locking detent or pawl 79 from the units-wheel, and therefore when the arm 89 is locked to the units-wheel and the latter is released from the detaining-pawl 79 the said units-wheel will turn and carry the arm 89 around until it engages the projected stop-pin.

Upon the release of the key the lever 98 will be swung down under the influence of the spring 88, Fig. 6, thus first causing the rod 98 to lower and permit the locking detent or pawl 79 to reëngage and lock the units-wheel and then to cause the disengagement of the teeth 93ª of the block 93 from the units-wheel and permitting the arm 89 to be carried back to its normal position by the operation of the spring 90, Fig. 16. The release of the key also causes a restoration of the bell-crank lever 11 to its normal position and permits the consequent retraction of the stop-pin.

I have referred to the fact that but fourteen movable stop-pins are employed, although there are fifteen different sizes of type represented by the fifteen longitudinal rows of keys in the keyboard. I would not have it understood, however, that the fifteenth stop-pin is not necessary. It is necessary, but as it is the last of the series and never has to be passed by the arm 89 it is made fixed. It is lettered 104ª, and is shown in Fig. 18.

I would here state that in order to prevent any rebound of the arm 89 and units-wheel when the arm strikes the stop-pin I may provide the arm with a spring-pawl 106, Fig. 16, and the lever 96 with a coöperating series of ratchet-teeth 107. As the arm 89 swings around the pawl passes over the several ratchet-teeth, remaining in engagement with the one last passed over.

The same downward movement of the lever 96 which effects the disengagement of the teeth 93ª of the block 93 from the teeth of the ratchet-wheel also disengages pawl 106 from its coöperating ratchet-teeth 107.

I have so far described how the units-wheel and its shaft are released and arrested after having been permitted to advance to a greater or less distance, or, in other words, through a greater or less number of units of space. I will now explain how the motion of the units-wheel shaft is employed to operate the line-space mechanism.

Secured to the units-wheel shaft, Figs. 11 and 19, is a small pinion 108, which is adapted to engage with and impart longitudinal motion to a sliding rack 109. This sliding rack is slotted longitudinally, as shown in Fig. 12ª. Through this slot extends a headed pin or bolt 110, whose head rests against the inside of the rack-bar and whose shank extends outward through a slot 111 in the front casing of the machine, as shown in Figs. 11 and 13.

Surrounding the bolt 110 is a sleeve 112, which has a front flange 113, against which presses an adjusting-nut 114, which works upon the screw-threaded outer end of the bolt, as shown in Figs. 11, 12ᵇ, 12ᶜ, and 13.

By loosening the nut 114 the bolt may be shifted in the slot of the rack, and by turning the nut so as to cause the rack to be pinched between the head of the bolt on one side and the end of the sleeve on the other the bolt may be held securely to the rack. The front flange 113 of the sleeve is provided with a pointer 115, and the slot 111, along which the pointer travels as the rack is moved longitudinally, is provided with a graduated scale, as shown. The length of the scale represents the maximum width of a line for which the types may be formed. When a line of shorter length is to be employed, the adjustable pointer is secured to its rack so as to stand normally more or less distant from the left-hand end of the scale, and the distance between it and the right-hand end of the scale will then represent the length of the line.

As the keys one after the other are struck the pointer will advance along the scale through a greater or less distance, according to the value of the key struck, and a glance at its location indicates to the operator the approximate position in the line of the character that has been last designated and shows him whether or not the next word or syllable is admissible in the line. I preferably provide means for sounding a bell or alarm before the justifying-margin is reached, in order that the operator may be apprised that he is nearing the justifying-margin. In Fig. 19, 107ª represents a bell or gong. Its striker 107ᵇ is adapted to be tripped by a pivoted lever 107ᶜ, whose upper end is provided with a pin 107ᵈ, that passes into a slot 109ª of the rack 109, Fig. 12ª, and is actuated at the proper time by being struck by the portion 109ᵇ of said rack.

The Justification-Indicator.

The justification-indicator is operated by the motion of the units-wheel shaft in the following manner: Secured to the units-wheel shaft is the gear-wheel 116, Figs. 10, 11, and 18, which meshes with the teeth of a smaller gear-wheel 117, mounted upon a shaft 118, that extends through the front casing of the machine and also through a dial-plate 119, secured to the latter, as shown in Figs. 10 and 11, a hand or pointer 120 being secured to the end of the shaft by a set-screw 121, as shown in Fig. 11. From this construction it will be seen that as the units-wheel shaft is turned the hand or pointer 120 will, through the described gearing, be also turned and caused to sweep over the face of the dial 119.

The face of the dial-plate is divided off into radial spaces by radial lines 122, each space representing a unit of measurement, as explained in the preamble to this specification, and each of the radial spaces is subdivided into smaller spaces by means of concentric lines 123, which are numbered according to the plan disclosed in said preamble.

The outer portion of the hand or pointer 120 is subdivided by transverse lines into spaces which are numbered from one to twelve consecutively, the numbers being indicative of the number of justifying space-type that may be required to be varied in any given line. As before explained, the dial is divided off, preferably, so as to indicate only the units of space in what is called the "justifying-margin"—that is to say, that portion of the line near its end which has to be filled out or occupied by justification.

As each key is depressed the hand or pointer 120 advances as many units of space as the particular character designated by the key calls for, and if the line is a long one the said hand or pointer may make several revolutions before the line-scale indicates that the justifying-margin is reached. Being apprised that the justifying-margin has been reached, the operator first ascertains the number of justifying space-type in the given line by looking at the number exposed at the aperture 124, Fig. 13, of the space-counting mechanism, then runs his eye along the hand or pointer 120 until he has located the corresponding number thereon, and then looks at the number on the dial immediately in front of said number on the hand or pointer and ascertains therefrom the requisite justifying-fraction to be added to the several justifying space-type and presses the appropriate justifying key or keys in the last or sixteenth longitudinal row of the keyboard to cause the appropriate perforations to be made in the record-strip.

*The Space-Counting Mechanism.*

Behind the aperture 124, Fig. 13, of the space-counting mechanism is arranged a longitudinally-sliding rack-bar 125, Fig. 19, provided on its face with consecutive numbers from "1" to "12" or more, inclusive, that as the bar is moved are adapted to be exhibited through the said aperture 124, Fig. 13. The teeth 126 of this rack-bar overhang a spring-pressed pawl 127, mounted on a reciprocating pawl-carrier 128, Figs. 11, 19, 19ª, and 19ᵇ. The pawl-carrier 128 is connected by a rod 129 to a bell-crank lever 130, Fig. 19, whose lower member is in turn connected by a rod 131 to the middle longitudinal key-lever 6, which, as shown in Figs. 6 and 7, is adapted to be depressed by the operation of any of the keys in the first horizontal row of keys nearest to the operator, which keys are all for designating space-type of different widths, as shown in Fig. 5.

When in the preparation of the record-strip for any given line of matter a space-key is struck for designating a space, the upper end of the bell-crank lever 130, Fig. 19, is moved forward, carrying with it the pawl-carrier 128, and the pawl 127 engages a tooth 126 of the rack and advances the rack-bar the distance of one tooth. The same movement of the bell-crank lever 130 which causes the pawl 127 to advance the rack-tooth also, through a rod 132 and bell-crank lever 133, causes a finger 134 on the upper arm of said bell-crank lever 133 to be thrown in front of one of the teeth of the rack-bar, thereby arresting the latter and preventing it from overthrowing under the influence of the actuating-pawl.

A spring-pawl 135 is adapted to engage with the upper portion of the teeth of the rack-bar and normally acts to prevent the backward movement of the rack-bar.

Upon the release of the space-key after its depression the pawl-carrier 128 moves backward to first position, and during this movement the back of the pawl 127 strikes a stationary pin 136 and is swung thereby slightly forward, so that its point will lie below the plane of the teeth of the rack-bar. This is the normal position of the pawl.

*The Resetting Mechanism.*

After the various types for a line have been designated and the justifying-fractions have been designated by the justifying-keys it becomes necessary to reset the parts for the production of the record for the next succeeding line.

The resetting of the space-counting mechanism is effected by the following mechanism: A hand-lever 59, Figs. 1, 2, 3, and 4, which has already been alluded to, is mounted upon a shaft 137, Figs. 4 and 6, to which is applied a spring 138, that tends to keep the outer end of the hand-lever elevated. On the inner side of the hand-lever is formed or secured a stop or projection 139, and projecting above this stop in the path thereof is the end of a transverse lever 140, Figs. 1, 4, and 18, that is pivoted in a hanger 141 at the opposite side of the machine, as shown in Fig. 18. Secured to the front side of this lever is a stud or projection 142, which stands beneath an arm 143 on a shaft 144, said arm being connected to a rod 145, that extends upward and is joined at its upper end to the lower arm of a bell-crank lever 146, Figs. 18 and 19, the upper end of the latter being in turn connected by a rod 147 to the upper arm of the pawl or detent 135. A spring 148, applied to the arm 143, tends to keep said arm down against a stud or projection 142 on the lever 140. As before stated, the hand-lever, under the influence of the spring 138, Fig. 4, is kept normally elevated, in which position it holds raised the outer end of the arm 140 and causes the projection 142 to lift the arm 143 and, through the rod 145 and bell-crank lever 146, causes the rod 147 to be drawn upon, so as to permit pin 135ª on the pawl 135 to play freely in the slot 147ª of the rod 147, as shown in Fig. 19. When, however, the hand-lever is depressed, the spring 148, acting upon the arm 143, draws down the rod 145, Fig. 19, tilts the bell-crank lever 146, and throws the connecting-rod 147 forward until the end of the slot in the latter strikes the pin 135ª of the pawl 135 and tilts the said pawl 135 out of engagement with the rack-bar 109, whereupon the spring 125ª draws the rack-bar 109 back to first position or starting-point.

The resetting of the line-space mechanism and of the justification-indicator and the rewinding of the spring 74, applied to the units-wheel shaft, are also effected by the depression of the hand-lever by the following mechanism: By reference to Figs. 10, 11, and 18, and particularly Fig. 18, it will be seen that the pawl or detent 79, which coacts with the units-wheel, is provided with a long arm 79ª, to which is connected a rod 149, that is slotted at its lower end, as shown at 149ª, to receive the end of a lever 150, projecting from and secured to the rock-shaft 144, as seen in Figs. 18 and 18ª.

When the hand-lever is depressed and the rock-shaft 144 is permitted to rock under the influence of the spring applied to it, the arm or lever 150 draws downward upon the rod 149 and rocks the pawl or detent 79 out of engagement with the units-wheel, and the latter being released is free to be rotated, with its shaft, in the contrary direction to that in which it has been fed, so as to rewind the spring 74 and set the units-wheel, and consequently the hand or pointer of the justification-indicator, back to the normal or starting-point.

The means for rewinding the spring 74 are as follows: Secured to the units-wheel shaft between the units-wheel 70 and the gear-wheel 116 is a small drum or pulley 151, Figs. 10 and 11. To this drum or pulley is fastened one end of a small cord or chain 152, Fig. 10. The other end of said cord passes over guide-pulley 153, Figs. 10 and 18, thence over other pulleys 154 155, Fig. 3, thence through a pendent weight 156, Fig. 3ᵇ, thence through a pulley 157 to the grooved periphery 158 of the winding-wheel 44, Figs. 3 and 4, to which it is secured, as shown in Fig. 3.

As the units-wheel shaft is advanced by the operation of the finger-keys, as hereinbefore explained, the cord 152 is wound upon the pulley 151, the weight 156 serving to keep the cord taut. Upon the release of the detent 79 from the units-wheel and the depression of the hand-lever 59 the said cord 152 is wound up upon the winding-wheel 44 and the drum or pulley 151 of the units-wheel shaft and units-wheel are rotated back to first position, ready for action in the production of the record for the next line of matter.

If the hand-lever 59 is depressed each time at substantially the same speed, there will be no difficulty in causing the arrest of the units-wheel at the same point each time and locking it there by the detent 79, but if the hand-lever is depressed too rapidly the units-wheel and the other gearing connected to the units-wheel shaft will be driven so rapidly as to cause them to overthrow the starting-point slightly, and to prevent the stoppage of the units-wheel shaft at the overthrown position, but on the contrary provide for its return to the starting or normal position each time, I have preferably arranged on the side of the units-wheel a series of pins 160, Figs. 10, 11, and 16, at, say, the distance of about fifteen teeth, and I arrange for coöperating with said series of pins a pawl-arm 161, Fig. 18, mounted upon a shank of a screw 162, Fig. 18ᶜ, that has a bearing in a bracket 163, as shown in said last-mentioned figure. Also mounted upon the shank of the screw 162 is an arm 164, which has a slot 164ª, into which projects a pin 165ª from the arm 161. A spring 165 connects the arms 161 and 164 together. To the arm 164 is connected a downwardly-extending rod 166, which receives the end of an arm 167, secured to the rock-shaft 144, Figs. 18ᵇ and 18ᵈ.

Projecting from the side of the pawl 161 is a pin 168, Fig. 18ᶜ, and upon the bracket 163 is arranged a stop 169, with which the pin 168 is adapted to engage when the pawl-arm is thrown forward, so as to limit the motion of the pawl. As before stated, the same motion of the hand-lever which causes the rewinding of the spring of the units-wheel shaft causes the shaft 144, Fig. 18, to be rocked. This rocking motion of the shaft last mentioned causes the arm 167 to draw down upon the rod 166 and through the pin-and-slot connection 165ª and 164ª cause the pawl-arm 161 to be thrown forward until its pin 168 strikes the stop 169, in which position the inclined end of the pawl will stand in the path of the pins 160 on the side of the units-wheel. As the units-wheel revolves in the resetting movement the pins 160 upon it strike and push past the pawl-arm 161, the pawl, however, immediately springing behind said pin. From this arrangement it results that if the units-wheel overthrows during the rewinding operation it will be carried back by the tension of the spring just wound up until the pin 160 that has last passed the pawl-arm 161 will be caught by the said last-mentioned pawl, thus arresting the units-wheel before the locking pawl or detent 79 reëngages it, the latter operation not taking place until the hand-lever rises and strikes the transverse lever 140.

It will be understood that one of the pins 160 stands opposite the pawl 161 when the parts are at the normal or starting point. Hence it becomes necessary that the units-wheel shall be brought back to this point at the end of each line in order that the pointer of the justification mechanism may always start from the same place on the dial. An overthrow of at least fifteen teeth of the units-wheel is thus provided for, which is quite margin enough.

The Galley-Feed Punch.

Another result of depressing the hand-lever 59 is to cause a galley-feed perforation to be punched in the record-strip and the latter to be advanced one line-space. The mechanism for accomplishing this is shown best in Figs. 6, 22, and 23. As shown in Fig. 22, a bell-crank lever 11ᵇ, Fig. 10, similar to the bell-crank lever 11 and having connected to it a punch 13ᵇ, similar to the punches 13, is provided with a depending arm 176, which is connected by a rod 175 to a swinging arm 174, Fig. 22. Coöperating with the swinging arm 174 is a pivoted pawl 171, which is mounted upon an arm 170, secured to the shaft 137, upon which the hand-lever is mounted, and is provided with a spring 173, which operates to hold its inner end against the stop 172. Each time the hand-lever is depressed the pawl 171, being held rigidly against its stop 172, is caused to strike the swinging arm 174 and through the rod 175 and depending arm 176 cause the bell-crank lever 11$^b$ to be vibrated and its punch 13$^b$, Fig. 10, to be driven through the record-strip.

The vibration of the bell-crank lever 11$^b$ during this operation causes the bail or yoke, which also extends beneath the bell-crank lever 11$^b$, to be operated, thereby causing a feed of the paper one line-space, as hereinbefore described. On the return of the hand-lever to normal position the pawl 171 again strikes the arm 174, but this time it yields and swings on its pivot, thus exerting no influence upon the arm 174.

Operation of the Machine.

The operation of the various parts of the machine having been hereinbefore described in connection with the description of the construction of these parts, it will not be necessary to again state the same in detail, but a brief resume of the sequence of operations will suffice.

Assuming that the operator wishes to produce a record for a line that is to contain the following matter—namely, "When in the course of human events it becomes necessary for one"—he would proceed as follows: He would first depress the hand-lever for the purpose of restoring all the parts to normal position. In doing this the galley-feed punch 13$^a$ would be operated. The perforations would be made in the strip at the point marked "Galley" at the top of the strip, Fig. 24. A further necessary result of the vibration of the hand-lever would be the feeding of the strip forward, so as to present a blank portion of the strip opposite the series of punches. He would next strike the key at the intersection of the fourteenth horizontal row of keys with the fifteenth longitudinal row of keys to designate a quad, such as would be used by a printer at the beginning of a paragraph. This would cause the perforation marked "Quad" to be produced and the paper to be again fed forward. The next character to be designated being a capital "W" he would press the key designated "W" at the intersection of the fourth horizontal row with the fifteenth longitudinal row. This operation would produce a single perforation in the record-strip, as indicated at W on Fig. 24. The reason why double perforations would not be required to be made for this capital "W," or in fact for any character in the fifteenth longitudinal row, is that the pin of the type-forming machine which controls the movement of the matrix-carrier to bring the matrices in the fifteenth or last row of the matrix-carrier into line with the casting mechanism is a fixed pin, and consequently no perforation is required to bring it into action, as in the case of the characters arranged in the other longitudinal row. After the making of the record for the capital "W" the operator depresses in order the keys for designating "h e n," and two perforations would be made in the record-strip for each of said characters, as shown. Then would follow designation of a space, which would also produce two perforations in the strip at the point marked "Space," Fig. 24, and so on until all the characters and spaces admissible in the line were designated. As the end of the line was neared the fact would be indicated both by the line-scale pointer and by the alarm connected to the same, and the operator would see that no more words or syllables were permissible in the line after the word "one."

A glance at the space-counter would show that eleven spaces had been designated for the line, and then running his eye along the pointer of the justification-indicator until the figure "11" was reached the operator would look at the number opposite said figure in the space of the dial immediately behind said figure and would find the dial-number to be also "11," which would indicate that a justifying-fraction of eleven-thousandths of an inch would have to be added to the eleven justifying space-types in the lines to fill out or justify the line, whereupon he would press the number "10" key in the sixteenth longitudinal row of keys and then the number "1" key in said sixteenth longitudinal row, thereby producing two justifying-perforations, as shown in Fig. 24. The end of the line having been reached, the hand-lever would be again vibrated, thereby causing another galley-feed perforation to be made in the strip, the strip to be fed forward another space and the space-counting mechanism, the line-scale mechanism, and the justification-indicator to be all returned to the starting-point or normal position, as hereinbefore described.

Having thus described my invention, what I claim as new is—

1. The combination of a series of keys, a series of key-levers upon which the keys directly operate, a second series of key-levers, a series of connections for communicating the motion of the keys to the said second series of key-levers and two series of punches operated respectively from the two series of key-levers; substantially as described.

2. The combination of a series of keys arranged in rows with reference to the body width, set way, of the characters they represent, a series of key-levers arranged beneath said rows of keys, each adapted to be operated by any key in its particular row, a second series of key-levers arranged alongside the first-mentioned series of key-levers, a series of transverse bails extending across the first-mentioned series of key-levers and communicating the motion of the keys to the second series of key-levers, and a series of punches for each series of key-levers; substantially as described.

3. The combination of a series of finger-keys, arranged in longitudinal and transverse rows, a series of long key-levers one for each longitudinal row of keys, a series of shorter key-levers arranged alongside the series of long key-levers in alternation therewith, a series of transverse bails, one for each transverse row of keys, for communicating the motion of all the keys in such transverse row to one of the shorter key-levers, and a series of punches for each series of key-levers; substantially as described.

4. The combination of the series of long key-levers, the series of shorter key-levers arranged in alternation with the first-mentioned series of levers and having the vertical projections or fingers, the transverse bails extending across the longer key-levers and above the projections or fingers of the shorter levers, and the series of finger-keys, bearing upon the series of long key-levers and having lateral projections bearing upon the transverse bails; substantially as described for the purpose specified.

5. The combination of the hollow stationary cylinder, the shaft 26 passing longitudinally through said cylinder, the toothed feed-disks secured to said shaft at opposite ends of the cylinder, the motor device applied to one end of said shaft, the ratchet-wheel on the opposite end of said shaft and the escapement-pawls coöperating with said ratchet-wheels and deriving motion from the key-levers; substantially as described.

6. The combination of a series of keys representing the various characters, &c., used in printing, a register or counter for indicating the number of justifying-type designated for a given line, and a justification-indicator operated by the keys and having a dial and pointer for indicating the appropriate justifying-fraction to be added to the ascertained number of justifying-type; substantially as described.

7. The combination of a series of keys representing the various characters in a font of type, a line-scale mechanism operated from the keys for indicating to the operator the filling up of the line and showing as the end of the line is neared how much space remains to be filled by justification, a register or counter operated by the keys representing the justifying-type for indicating the number of justifying-type designated for a given line, and a justification-indicator operated by the keys and having a dial and pointer for indicating the appropriate justifying-fraction to be added to the ascertained number of justifying-type, substantially as described.

8. The combination with a keyboard provided with a series of keys representing the various characters, spaces, &c., in a font of type, another series of keys representing justifying-fractions that may be added to the normal width of the justifying-type for a line, a units mechanism, which is advanced upon the operation of each key representing a character, space, &c., as many units of measurement as the character, space, &c., designated by that particular key will occupy, set way, in the line, a register or counter for registering the number of justifying-type, such, for instance, as space-type, designated for the particular line, a justification-indicator operated by the units mechanism for showing the number of units of measurement remaining in the line as the end of the latter is neared and indicating the justifying-fraction to be added to the justifying-type for the line, and two sets of punches, one operated by the keys representing the characters, &c., and the other by the justifying-keys, for recording the operations of said keys; substantially as described.

9. The combination with a keyboard provided with a series of keys representing the various characters, &c., in a font of type arranged in rows with reference to the body width, set way, of the characters for which they stand, another series of keys representing justifying-fractions that may be added to the normal width of the justifying-type for a line, a units mechanism which is advanced upon the operation of each key representing a character, space, &c., as many units of measurement as the character, space, &c., designated by that particular key will occupy, set way, in the line, a register or counter for registering the number of justifying-type, such for instance, as space-type, designated for the particular line, a justification-indicator operated by the units mechanism for showing the number of units of measurement remaining in the line as the end of the latter is neared and indicating the justifying-fraction to be added to the justifying-type for the line, and two sets of punches, one operated by the keys representing the characters, &c., and the other by the justifying-keys, for recording the operations of said keys, substantially as described.

10. The combination with a keyboard provided with a series of keys representing the various characters, spaces, &c., in a font of type, another series of keys representing justifying-fractions that may be added to the normal width of the justifying-type for a line, a units mechanism which is advanced upon the operation of each key representing a character, space, &c., as many units of measurement as the character, space, &c., designated by that particular key will occupy, set way, in the line, a line-scale mechanism for warning the operator that the end of the line is being approached, a register or counter for registering the number of justifying-type, such for instance as space-type, designated for the particular line, a justification-indicator operated by the units mechanism for showing the number of units of measurement remaining in the line as the end of the latter is neared and indicating the justifying-fraction to be added to the indicated justifying-type for the line, and two sets of punches, one operated by the keys representing the characters, &c., and the other by the justifying-keys, for recording the operations of said keys; substantially as described.

11. The combination with the units-wheel and its motor of the swinging arm mounted on the units-wheel shaft, the toothed block movable longitudinally of said arm, the pivoted lever having a curved recess or raceway in which the toothed block is free to move, and the keys and connections for vibrating the pivoted lever; substantially as described.

12. The combination with the units-wheel and its motor, the swinging arm mounted on the units-wheel shaft, the toothed block movable longitudinally of said arm, the swinging lever having a recess or guide for the toothed block, the pawl or detent which holds the units-wheel normally in check and the connection between the hinged lever and said pawl or detent; substantially as described.

13. The combination with the units-wheel and its motor, the swinging arm, toothed block, the pivoted lever having the recess or guide in which the toothed block slides, the detent or pawl engaging the ratchet-wheel and connected to the pivoted lever, the keys and the distance-determining stops projected in the plane of the swinging arm by the operation of the keys; substantially as described.

14. The combination with the units-wheel, the swinging arm mounted upon the units-wheel shaft, the toothed block, the pivoted lever, by which the toothed block is supported and guided, the ratchet-teeth on the pivoted lever and the pawl carried by the swinging arm, whereby rebound of the swinging arm when it strikes a distance-determining stop is prevented; substantially as described.

15. The combination with the keys, the pivoted lever of the units-wheel mechanism and connections between the keys and said pivoted lever for operating the latter upon the depression of any key, the units-wheel, the swinging arm mounted upon the units-wheel shaft, the toothed block carried and guided by the pivoted lever and adjustably connected to the swinging arm, the pawl or detent for the units-wheel and the means for operating it, the dial of the justifying-indicator divided radially into spaces representing units of measurement and the hand or pointer coöperating with said dial driven from the units-wheel shaft; substantially as described.

16. The dial of the justification-indicator divided radially into spaces each of which represents a unit of measurement and the hand or pointer driven from the units-wheel shaft coöperating with said dial, the radial spaces of the dial being divided up and having numbers applied to it representing the justifying-fractions and the hand or pointer having also numbers applied to it representing the various numbers of justifying-type that may be designated for a given line, substantially as described and for the purpose specified.

17. The combination with the space-key, its lever and punch, of the counting or registering mechanism consisting of the sliding rack bearing numbers as described, the vibrating pawl-carrier and pawl carried thereby for engaging the teeth of said rack-bar, the rods and levers for operating said pawl-carrier from the space-key bar and the stop-pawl for preventing overthrow of the rack-bar; substantially as described.

18. The combination with the rack-bar of the space counting or registering mechanism, of the spring-pressed pawl 135, rod 147, bell-crank lever 146, rod 145, arm 143 on rock-shaft 144, of the resetting mechanism; substantially as described.

19. The combination with the units-wheel, the pawl or detent 79 in engagement therewith, the rod 98 having a slot at its upper end into which projects a pin on the pawl, the rod 149, connected to the arm 179 of the pawl, and the arm 150 on shaft 144 of the resetting mechanism; substantially as described and for the purpose specified.

20. The combination of the units-wheel and the mechanism for winding the motor which propels the same, of the pins 160 projecting laterally from the sides of the units-wheel, of the pawl-arm 161, arm 164, spring 165, pin 168, stop 169, and arm 167 on the rock-shaft 144 of the resetting mechanism, whereby the units-wheel is arrested at the proper point if overthrown by the too rapid winding of its motor; substantially as described.

21. The means for punching the galley-feed perforation in the record-strip consisting of the arm 170 on the hand-lever shaft, spring-pressed pawl 171, stop 172, swinging arm 174, rod 175, bell-crank lever 11$^b$ and punch 13$^b$; substantially as described.

22. The combination in a record-strip-preparing mechanism, of a series of record-producing devices for recording successive characters and spaces, an indicator for indicating the number of justifying-type, and a justification-indicator for indicating the necessary variations in the width of said justifying-type to complete a line.

23. The combination in a record-strip-preparing mechanism, of two series of record-producing devices, the one pertaining to character-spaces, and the other, to variations in width of selected justifying-type; an indicator controlled by said series of character-designating devices, for indicating the aggregate space occupied by the designated characters; an indicator showing the number of the designated justifying-type; and a justification-indicator actuated by the character-designating devices to indicate which of the series of devices controlling variations in width of selected type is to be actuated to produce a justified record-strip; substantially as described.

24. The combination in a record-strip-preparing mechanism of the following elements, to wit: a series of type-designating punches; a series of justification-designating punches; a series of keys controlling said punches; an indicator responding to the action of the keys controlling the justifying-type to indicate the number of the latter; and a justifying-indicator responsive to the keys controlling the type-designating punches, and operating to indicate which of the series of justification-punches is to be operated to produce a record-strip for a justified line; substantially as described.

25. The combination in a record-strip-preparing mechanism of the following elements, to wit: a series of type-designating punches, a series of justification-designating punches; keys controlling both series of punches; an indicator responding to the keys of the type-designating punches to indicate the aggregate length of the line as registered; an indicator responding to the action of the keys controlling such of the type - designating punches as are assigned to justification; and a justifying-indicator responding to the keys controlling the type-designating punches and operating to indicate the appropriate justification-designating punch or punches to produce the record for a justified line, substantially as described.

TOLBERT LANSTON.

Witnesses:
ALEX. S. STEWART,
MELVILLE CHURCH.